(12) United States Patent
Russell et al.

(10) Patent No.: US 11,881,008 B2
(45) Date of Patent: Jan. 23, 2024

(54) ENCODING ENHANCED INFORMATION INTO PIXEL CHANNELS

(71) Applicant: Intuitive Research and Technology Corporation, Huntsville, AL (US)

(72) Inventors: Kyle Jordan Russell, Huntsville, AL (US); Chanler Megan Crowe Cantor, Madison, AL (US)

(73) Assignee: INTUITIVE RESEARCH AND TECHNOLOGY CORPORATION, Huntsville, AL (US)

( * ) Notice: Subject to any disclaimer, the term of this patent is extended or adjusted under 35 U.S.C. 154(b) by 365 days.

(21) Appl. No.: 17/318,552

(22) Filed: May 12, 2021

(65) Prior Publication Data

US 2022/0366608 A1 Nov. 17, 2022

(51) Int. Cl.
*G06T 7/90* (2017.01)
*G06V 10/56* (2022.01)
*G06T 7/00* (2017.01)
*G06V 10/75* (2022.01)

(52) U.S. Cl.
CPC .......... *G06V 10/56* (2022.01); *G06T 7/0012* (2013.01); *G06T 7/90* (2017.01); *G06V 10/751* (2022.01); *G06T 2207/10024* (2013.01)

(58) Field of Classification Search
CPC .... G06V 10/56; G06V 10/751; G06T 7/0012; G06T 7/90; G06T 2207/10024; G06T 1/0028
USPC .......................................................... 382/162
See application file for complete search history.

(56) References Cited

U.S. PATENT DOCUMENTS

| | | | |
|---|---|---|---|
| 2018/0005449 A1* | 1/2018 | Wallner | G06T 15/205 |
| 2019/0378235 A1* | 12/2019 | Kamath | H04N 1/3232 |
| 2020/0005831 A1* | 1/2020 | Wallner | G11B 27/036 |
| 2020/0352518 A1* | 11/2020 | Lyman | A61B 6/5258 |
| 2021/0037230 A1* | 2/2021 | Martin | G06V 20/52 |
| 2022/0301094 A1* | 9/2022 | Filler | H04N 1/32256 |
| 2023/0091371 A1* | 3/2023 | Ren | G06T 7/10 382/128 |

* cited by examiner

*Primary Examiner* — Ali Bayat
(74) *Attorney, Agent, or Firm* — Workman Nydegger

(57) ABSTRACT

The disclosed techniques are focused on processes for encoding an enhanced image with non-image data. Notably, the "non-image data" is distinct from "image data" in that the image data defines display characteristics of an image (e.g., display properties of a pixel) while the non-image data is unrestricted and can describe any data, even data different than display characteristics. An image is accessed, where the image includes at least one pixel that is associated with at least one color channel. Non-image data is encoded into the color channel. An index, which maps where the non-image data has been encoded in the color channel of the pixel, is generated or modified. As a result of encoding the non-image data into the color channel, an enhanced image is generated.

20 Claims, 16 Drawing Sheets

ENCODING ENHANCED INFORMATION INTO PIXEL CHANNELS

BACKGROUND

Many electronic devices have a display that is configured to display digital images. A digital image is comprised of any number of "pixels." In digital imaging or processing, a "pixel" is the smallest addressable element for the digital image. Stated differently, a pixel is the smallest element that can be controlled in a digital image.

The intensity of each pixel is variable. Often, pixels include a red aspect, a green aspect, and a blue aspect. In some cases, other color schemes (e.g., cyan, magenta, yellow, and black) can be used. The combination of the various different color aspects allows for any color across the spectrum to be represented by the pixel. For instance, by modifying the intensity of the red, green, and blue aspects of a given pixel, that pixel can appear as though it has or is projecting a particular color. These different colors are addressable via the structure of the pixel.

Although digital image processing has been around for quite some time, there are still numerous ways in which the processing can be improved. For instance, it is often desirable to improve image storage, image transmission, and image compression. Additionally, with the proliferation of cloud computing, it is often desirable to make communications with the cloud more efficient, especially when transmitting digital images. What is needed, therefore, is a technique that improves operations involving digital image processing and transmission.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices (e.g., wearable devices, hardware storage devices, etc.), and methods for encoding (and decoding) an enhanced image with non-image data. Notably, so-called "non-image data" is distinct from "image data" in that image data is limited to defining or describing various display attributes associated with an image (e.g., color or display characteristics of a pixel) while the non-image data is not so limited and can describe data beyond only image or display attributes.

For example, some embodiments access an image. The image can include at least one pixel that is associated with at least one color channel. Non-image data is encoded into the color channel of the pixel. An index, which maps where the non-image data is encoded (e.g., encoded in which specific color channel), is generated or modified. As a result of encoding the non-image data into the color channel, an enhanced image is generated.

Some embodiments access an image. This image comprises one or more pixels. Each pixel in the one or more pixels is associated with a corresponding one or more color channels. For a selected pixel that is selected from among the one or more pixels, the embodiments encode image data into a selected color channel that is selected from among the selected pixel's corresponding one or more color channels. Also, for that selected pixel, the embodiments encode non-image data into a second color channel of the selected pixel. Notably, an index provides a mapping as to where the non-image data has been encoded in the image. Furthermore, as a result of (i) encoding the image data into the selected color channel and (ii) encoding the non-image data into the second color channel, an enhanced image is generated.

Some embodiments access an enhanced image. The enhanced image comprises one or more pixels, and each pixel in the one or more pixels is associated with a corresponding one or more color channels. The embodiments also access an index that maps where non-image data has been encoded in the enhanced image. For a selected pixel that is selected from among the one or more pixels, the embodiments decode image data that has been encoded in a first color channel of the selected pixel. For that same selected pixel, the embodiments decode non-image data that has been encoded in a second color channel of the selected pixel. Notably, the index is used to identify that the second color channel is storing the non-image data. An image is generated based on the image data. A file is also generated, where the file includes the non-image data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
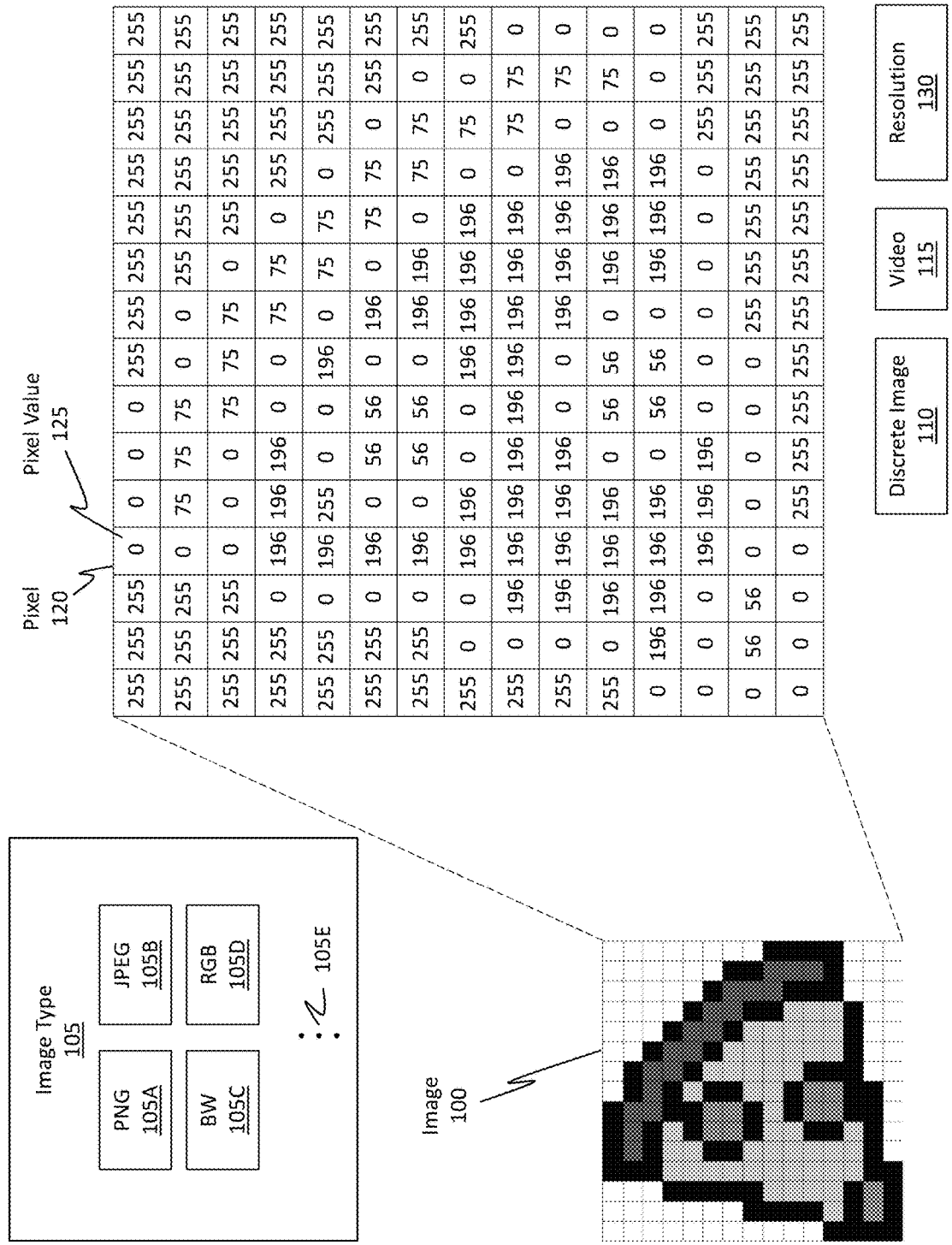
FIG. 1 illustrates an example of a digital image that includes any number of pixels.

Embodiments disclosed herein relate to systems, devices (e.g., wearable devices, hardware storage devices, etc.), and methods for encoding an enhanced image with non-image data. Notably, so-called "non-image data" is distinct from "image data" in that image data is limited to defining display characteristics of an image (e.g., perhaps color characteristics of a pixel) while the non-image data is not so limited and can describe data other than display characteristics. That is, "image data" can be data defining or describing any attribute associated with an image. Such data includes, but is not limited to, the red, green, blue color characteristics of a pixel, the hue, saturation, or tint characteristics, the transparency characteristics, and so on. So-called "non-image data" is not so limited and can define or describe any data, even data entirely independent of an image. For instance, non-image data can be data describing a spreadsheet listing the stock market prices for a particular data. Non-image data can be data describing the birthday of a newborn baby. From this introduction, one will appreciate how non-image data is unlimited in its scope and can refer to any type of data. In this sense, the format, structure, or interpretation of image data can be quite different from the format, structure, or interpretation of non-image data.

With that being said, some embodiments access an image. The image can include a pixel that is associated with a color channel. Non-image data is encoded into that color channel. An index, which maps where the non-image data has been encoded, is generated or modified. As a result of encoding the non-image data into the color channel, an enhanced image is generated.

Some embodiments access an image. This image includes one or more pixels. Each pixel is associated with one or more color channels. For a selected pixel, the embodiments encode image data into a selected color channel of that pixel. Also, for that selected pixel, the embodiments encode non-image data into a second color channel of that pixel. An index provides a mapping as to where the non-image data has been encoded. Furthermore, as a result of (i) encoding the image data into the one color channel and (ii) encoding the non-image data into the other color channel, an enhanced image is generated.

Some embodiments access an enhanced image. The enhanced image comprises one or more pixels, and each pixel is associated with one or more color channels. The embodiments access an index that maps where non-image data has been encoded in the enhanced image. For a selected pixel, the embodiments decode image data that has been encoded in a first color channel of the pixel. For that same pixel, the embodiments decode non-image data that has been encoded in a second color channel of the pixel. The index is used to identify or determine that the second color channel is storing the non-image data. An image is generated based on the image data. A file is also generated, where the file includes the non-image data.

Examples Of Technical Benefits, Improvements, And Practical Applications

The following section outlines some example improvements and practical applications provided by the disclosed embodiments. It will be appreciated, however, that these are just examples only and that the embodiments are not limited to only these improvements.

The disclosed embodiments bring about substantial and practical improvements to the technical field. For instance, the embodiments are able to intelligently and efficiently "pack" or "encode" additional data (i.e. "non-image data") into an image's color channels (also sometimes referred to as "texture channels") in addition to data used to describe or display the contents of the image (i.e. "image data"). As recited above, "image data" is any data defining or describing attributes, parameters, or characteristics associated with an image, such as, for example, the color values of a pixel or how that pixel is to be rendered or displayed. On the other hand, "non-image data" is not so limited and can define or describe any type of data, without limit.

Using a grayscale image as an example, it is often the case that the image has three or perhaps four different color channels, such as a red color channel, a green color channel, a blue color channel, and sometimes even an alpha channel. As will be discussed later, different color configurations can also be used (e.g., CMYK). The phrases "color channel," "texture channel," or simply "channel" are interchangeable with one another in this document.

Because the image is a grayscale image (i.e. only a single color component will be visualized as opposed to multiple color components, such as RGB), a single color channel can be populated with image data in order to accurately represent the contents or the visual characteristics of the image. In accordance with the disclosed principles, the remaining two or three channels can be "re-purposed" or "multi-purposed" in a manner so that those remaining channels can be encoded with non-image data. In this manner, the embodiments can be used in image processing to store data in a way that can be easily manipulated and viewed by any number of applications.

Using the disclosed techniques, the embodiments are able to generate an "enhanced image" that includes both image data and non-image data. This enhanced image can then be transmitted to external systems, stored, or otherwise maintained. By packing additional data into an image data structure, the disclosed embodiments are able to significantly reduce the amount of bandwidth that is used for transmissions because a single image can now be "packed" with additional data. Previously, that additional data would have been transmitted in its own packets, thereby leading to surges in bandwidth usage. Accordingly, the disclosed embodiments significantly improve the technical field by achieving efficiency gains in terms of bandwidth and resource utilization.

The disclosed principles can beneficially be practiced in scenarios involving cloud computing. By packing additional data into a data structure, such as an image, the embodiments can reduce the number of packets that are transmitted back and forth with the cloud, thereby improving network communications. Furthermore, with reduced transmissions, there is a lower likelihood of needing to retransmit data due to data loss or data corruption.

Another benefit involves the use of a GPU and shaders. Generally, a shader is a type of program that is compiled to run in the GPU. Shaders process three-dimensional information in combination with other information (e.g., lighting, texture, etc.) to perform 3D modeling. Through the use of the GPU, shaders, and the disclosed principles, the embodiments are able to store high fidelity non-image data into color channels that are not being used to store image data.

Furthermore, the disclosed embodiments are beneficially able to calculate data (e.g., non-image data) and store that non-image data into the different channels of a picture or image file (PNG, JPEG, etc.). This non-image data can represent anything. The picture or image file can contain either RGB or RGBA channels. The R channel includes the red percentages or values of the image. The G channel contains the green values, and the B channel contains the blue values of the image. The combination of these three channels creates complex colors in digital images. The A Channel (Alpha Channel) contains the transparency values of the image. Each of these channels contains a value for every pixel in the image. The embodiments are able to coordinate non-image data, store that data, and even evaluate that data by packing the data into the channels. Because the data is stored in each of the channels in a way that allows them to be indexed, the data can be coordinated between the channels (time dependent data, pixel dependent data, etc.). These files can be used by computer programs for easy visualization of the data in a new way.

The disclosed techniques can be used in various technical fields. Example fields include, but are not limited to, cybersecurity, medical imagery viewers, and other applications. Accordingly, these and numerous other benefits will be discussed throughout the remaining portions of this disclosure.

Image Characteristics

Attention will now be directed to FIG. 1, which illustrates an example of an image 100 (e.g., a slice of pizza). The image 100 can be of any type, as shown by image type 105. By way of example and not limitation, the image type 105 includes a Portable Network Graph PNG 105A type, a Joint Photographic Experts Group JPEG 105B type, a Black and White BW 105C type (or monochrome), and a Red, Green, Blue RGB 105D type. The ellipsis 105E indicates that other image types can also be used. For instance, other image types include a Tag Image File Format TIFF type, a Graphics Interchange Format GIF type, an Encapsulated PostScript EPS type, and so on.

The image 100 can be a discrete image 110; meaning it is a standalone image, such as a picture. Alternatively, the image 100 can be included as a part of a video 115.

As shown in FIG. 1, the image 100 comprises a number of pixels (e.g., pixel 120), where each pixel is associated with one or more pixel values (e.g., pixel value 125). In this case, the image 100 is a black and white image (or monochrome), and each pixel is assigned a pixel value along the black and white color spectrum. For an 8 bit color spectrum, the value 0 corresponds to a fully black color while the value 255 corresponds to a fully white color. Values in between 0 and 255 represent different levels of gray. Therefore, in this example, the single pixel value 125 (currently having a value of "0") represents an 8 bit pixel value corresponding to the 0-255 black and white spectrum. Of course, this is an example only, and the embodiments should not be limited to only this scenario. Indeed, color images (e.g., RGB images) can also be used and can have different pixel values. Furthermore, different pixel values can be used depending on the number of bits a pixel has assigned to it. Further details on these features will be provided later.

The resolution 130 (i.e. an "image resolution") refers to the number of pixels that are displayed per unit area (e.g., per "inch" of an image or perhaps the total volume of pixels). Lower image resolutions mean that there are fewer pixels per unit area while higher image resolutions mean that there are more pixels per unit area.

As stated above, in the example shown in FIG. 1, the pixel values (e.g., pixel value 125) range from 0 to 255. Here, each pixel is provided with 8 bits, so each pixel can have a color value between 0 and 255. One will appreciate, however, how more or less bits can be provided to each pixel. For instance, a single bit can be assigned to each pixel. In this case, the bit value would be either a "0" or a "1." In this example, the value "0" can be a black color while the value "1" can be a white color. Of course, other colors can be assigned to those pixel values. In this example, however, only two colors can be represented when one bit is available.

As the number of bits increases, the number of colors that can be used also increases (e.g., the number of colors will be $2^N$, where N is the number of bits). When two bits are used, a total of four colors can be used. When three bits are used, a total of eight colors can be used. The disclosed embodiments are operational with any number of bits, without limit. Examples of the number of bits include, but are not limited to, 1 bit, 2, 4, 8, 16, 32, 64, 128, 256, 512, and more than 512 bits per pixel.

Color (aka "Texture") Channels

Figure 2:
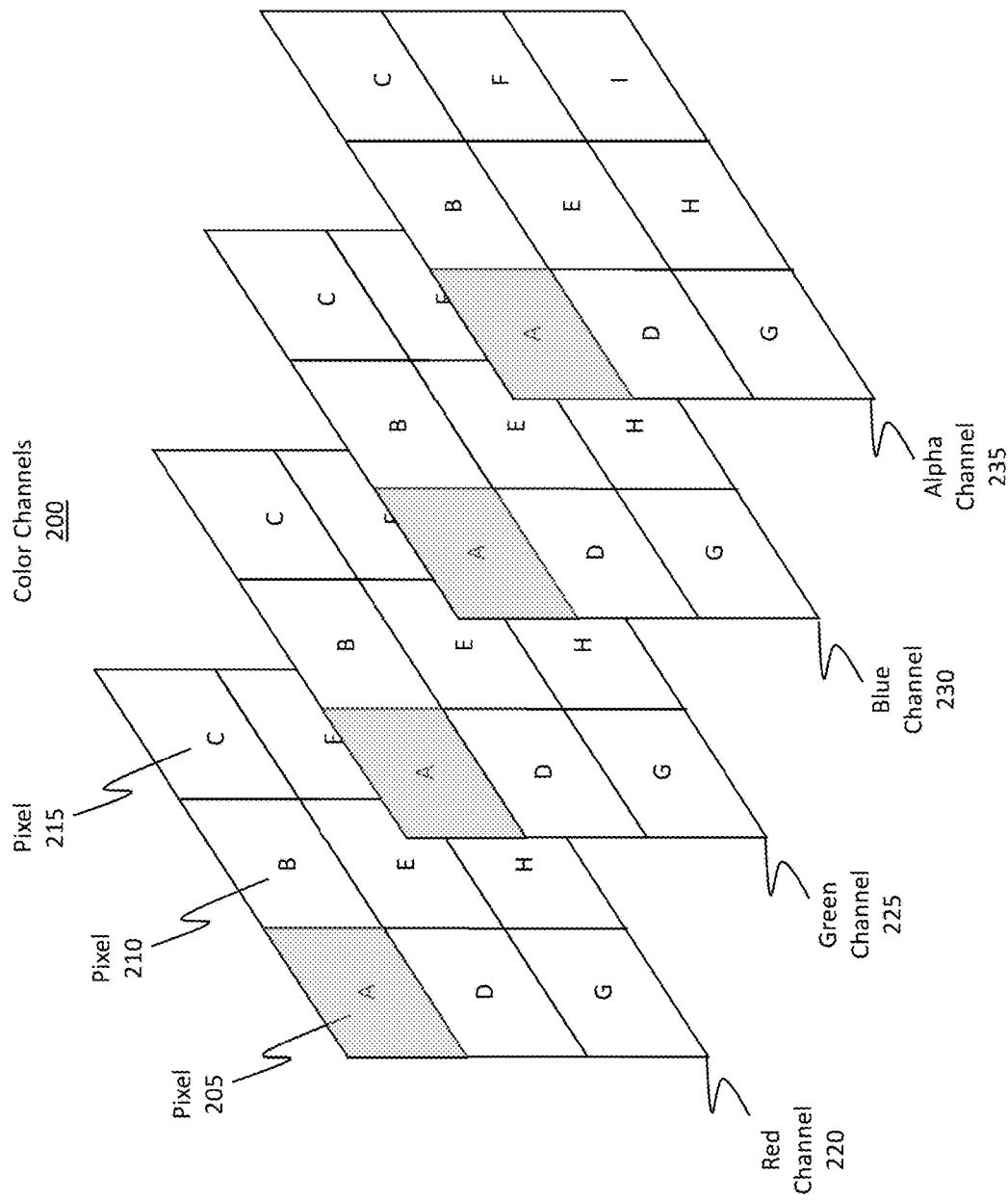
FIG. 2 illustrates the various color channels of pixels in an image.

Each pixel (i.e. the smallest addressable unit for an image) can be associated with one or more "color channels." Generally, a color channel is a primary color layer for a digital image. The combination of the pixel's color channels defines a color for that pixel. FIG. 2 is illustrative.

FIG. 2 shows example color channels 200 for a set of pixels (e.g., pixel 205, pixel 210, pixel 215). The letter designation "A," "B," "C," "D," and so forth indicates different pixels (e.g., pixel "A" is also labeled as pixel 205). In this scenario, nine total pixels are illustrated (pixels "A" through "I").

Here, each pixel is associated with four different channels; namely, a red channel 220, a green channel 225, a blue channel 230, and an alpha channel 235. The red, green, and blue channels reflect the amount of red, green, and blue color elements that will be displayed for that particular pixel. Different intensities (aka "values" or "pixel values") for the red, green, and blue channels allow for any color to be displayed on a digital screen. For instance, a value of 255 for the red channel and values of 0 for the green and blue channels will result in the pixel displaying red. The color magenta will be displayed when the red, green, and blue channels have equal intensities. Similarly, the color yellow will be displayed when the red and green channels have equal intensities while the blue channel has no intensity.

Often, the alpha channel 235 indicates the amount of transparency or opacity that will be present for the red, green, and blue channels. In some cases, the alpha channel 235 is not included for a pixel, such that the pixel has only three color channels. In some cases, a pixel might have more than three channels (e.g., 4, 5, 6, 7, 8, 9, 10, or more than 10 channels).

The above scenario describes a situation using red, green, and blue color channels; other colors can be used, however. For example, a cyan, magenta, yellow, and black (CMYK) image can be used, with corresponding color channels for the pixels in that image. Accordingly, use of "red," "green," and "blue" is for example purposes only and should not be viewed as being binding.

Each channel for each pixel can be assigned a certain number of bits. For example, the red channel 220 may be assigned 8 bits, the green channel 225 may be assigned 8 bits, the blue channel 230 may be assigned 8 bits, and the alpha channel 235 may be assigned 8 bits.

Of course, a different number of bits may be assigned. For instance, each channel may be assigned 1 bit, 2 bits, 4 bits, 8 bits, 16 bits, 32 bits, 64 bits, 128 bits, 256 bits, 512 bits, or more than 512 bits. As the number of bits increases per channel and as the number of pixels increases, the quality and crispness of the resulting image also increases.

With a RGB image having no alpha channel, a so-called "48-bit" RGB image will assign 16 bits to each of the different channels. A "24-bit" RGB image will assign 8 bits to each of the different channels. With a RGB image having an alpha channel, a "32-bit" RGB image will assign 8 bits to each of the four different channels. Accordingly, when referring to an image having a particular bit size (e.g., a 48-bit size), the bit size refers to the combined total of the bits in all of the channels of a given pixel.

In many applications, the use of a "monochrome" image (e.g., an image that displays a single color or different shades of that single color) or a "black and white" (BW) image or a "grayscale" image is desirable. Although black (and different levels or shades of black, eventually reaching even a white color) is the color that is often used in a "monochrome" image, it should be noted that any color can be used, not strictly only "black." For instance, red, green, blue, or any color along the color spectrum can be used in varying degrees or shades in a monochrome image. Therefore, although this disclosure may frequently reference "BW images," one will appreciate how the disclosure is equally applicable to any monochrome image (of any color) as well.

Many medical imaging systems use BW images. Examples of medical imaging systems or devices include x-ray systems, CT scanners, MRIs, and so on. Even some virtual reality applications use BW images. Accordingly, one will appreciate how there are numerous scenarios where it is desirable to use a BW image.

When a BW image is used, it is often the case that a single color channel can fully represent the color or display characteristics for a given pixel. For instance, any one of the red, green, or blue color channels can fully define the resulting color for that pixel in a BW image. To be clear, instead of a combination of multiple color channels operating together to form a color, a BW color can be displayed using only a single color channel.

Notably, although a channel may be defined as a "red" color channel, that does not mean the channel is applicable only to the color "red." Instead, the channel can actually be used to store data defining any display or color characteristics of a given pixel. For example, a "red" color channel can be used to store display attributes for a "black" (and its shades) color; meaning the pixel will be black or a shade of black. If only a single channel is sufficient to store the display characteristics for a monochrome image, it follows then that the remaining two channels (or three in the case where an alpha channel is present) can be left unused and thus will be available for other purposes.

In accordance with the disclosed principles, the embodiments "re-purpose" or "multi-purpose" any unused channels in an image (whether it be a BW image or a RGB image or any type of image). The unused channels are populated with non-image data. That is, one or more channels of one or more pixels are populated with non-image data. Furthermore, one or more channels of one or more pixels can also be populated with image data, resulting in an image that has both image data and non-image data. An example will be helpful.

Suppose an image is a BW image. In this case, the red channel 220 from FIG. 2 for each pixel in a set of one or more pixels can be used to fully describe the visual contents or display attributes that are to be embodied by that image. For instance, suppose the image is of a slice of pizza, as was shown in FIG. 1. The red channel 220 for each pixel can be used to fully store the data needed to visualize that specific pixel's corresponding illustration or portion of the slice of pizza. The remaining channels for each pixel (e.g., the green channel 225, the blue channel 230, and optionally the alpha channel 235) can be reserved to store non-image data.

As an example, the bits used for the green channels can perhaps be used to store data about the entity or artist that created the image of the pizza slice. The bits used for the blue channel can perhaps be used to store data about when the image was generated. The bits used for the alpha channel can perhaps be used to store an audit log detailing any changes that have been made to the image. These additional pieces of data are considered non-image data because they do not describe or relate to display characteristics of how a pixel is to be rendered or illuminated.

Figure 3:
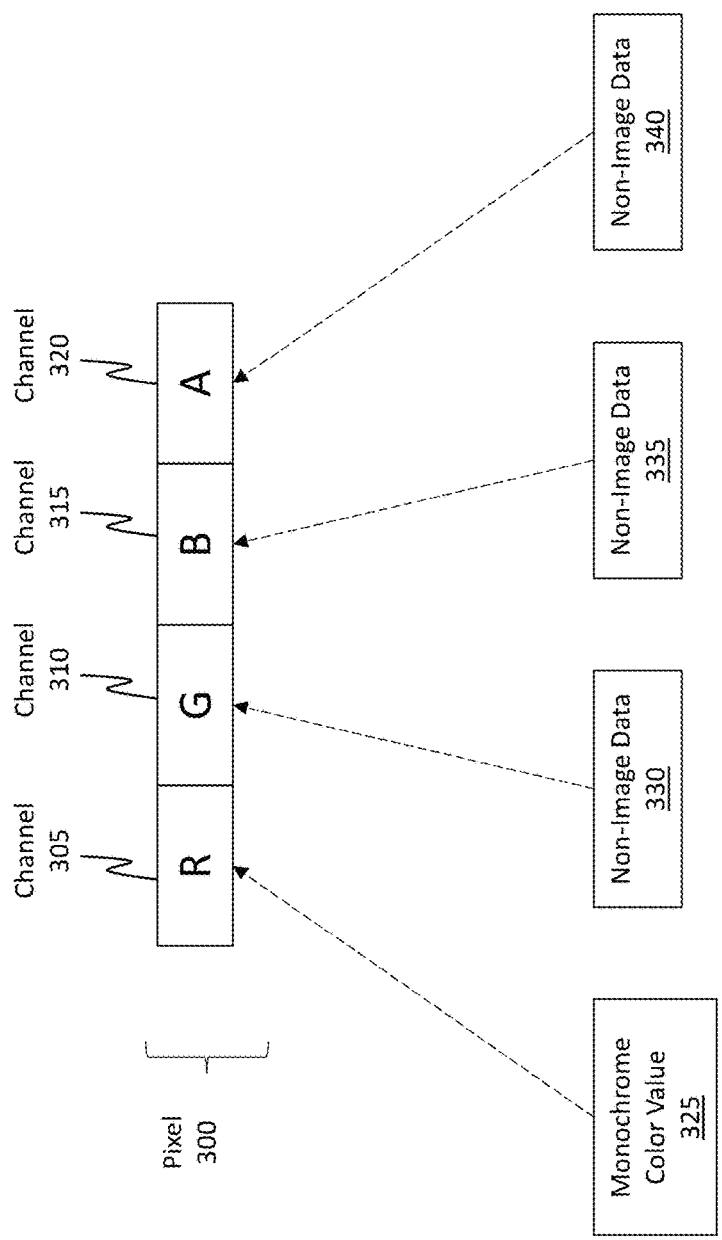
FIG. 3 illustrates how different types of data can be stored or encoded in the different color channels of a pixel.

As another example, suppose the image is a medical image, such as a CT image. Typically, the CT image is a BW image. Here, the red channels (or any of the other channels) for the pixels can be used to store the entire data needed to represent the CT image details. The remaining channels are the left unused. In accordance with the disclosed principles, the embodiments can populate these remaining channels (or rather the bits of those remaining channels) with non-image data. As an example, the remaining channels can be used to store data corresponding to a Hounsfield value, which is a unit of measurement that reflects the relative quantitative measurement of radio density in a CT image. Notice, the Hounsfield data is entirely unique and independent of the image data, which defines or describes the visual or display characteristics of the image. In some cases, the bits in the channels can be used to store SUV values (e.g., Standardized Uptake Values), which are measurements generated by a PET scanner and are related to the tissue concentration. Of course, these are examples only. Indeed, any type of non-image data can be stored in the bits associated with those unused channels. FIG. 3 provides additional details.

FIG. 3 shows a single pixel 300 and that pixel's corresponding channels (e.g., channel 305, channel 310, channel 315, and channel 320). In this example case, pixel 300 is included as a part of a BW image, though the embodiments are usable with RGB or any color images as well. In any event, in this scenario, only a single channel is needed to fully detail the color information for the pixel 300. To illustrate, a monochrome color value 325 is assigned to the channel 305 (e.g., the "R" or "Red" color channel). Of course, any of the channels can be used to reflect the color or display attributes for the pixel 300 and not just the red color channel. The remaining channels (channels 310, 315, and 320) are not needed to reflect the color or display attributes for the pixel 300.

In accordance with the disclosed principles, the embodiments are able to encode, populate, or fill those other channels with non-image data. In FIG. 3, the channel 310 is populated with non-image data 330; the channel 315 is populated with non-image data 335; and the channel 320 is populated with non-image data 340.

In some instances, the non-image data may be associated with the image in a general manner. For example, the non-image data might refer to an author or creator of the image, the time when the image was generated, an audit log detailing when and how the image was modified, and so on. Although some association might exist between the non-image data and the image itself (as described above), the non-image data does not define display characteristics or properties of pixels (e.g., how the pixel is to be illuminated with color). Instead, the image data is reserved to provide those display characteristics.

In some cases, such as when the image is a medical image, the non-image data can refer to a Hounsfield value. In some cases, the non-image data can list the type or model number or other identifying information for the medical device that was used to generate the image. In some instances, the non-image data might not be associated with the image other than simply being stored or encoded in that image. For instance, the non-image data can refer to a calendar event or to text of a memo or any other data. Accordingly, the non-image data can refer to any type of data that is distinct from color or display characteristics of pixels in an image.

As another example, the channel 305 might be associated with 8 bits. Those 8 bits can be mapped to a 0-255 color coding scheme used to define the display parameters for the pixel 300. Although the channels 310, 315, and 320 might also be associated with 8 bits each, those 8 bits might be mapped to a different scheme instead of a color code or color scheme. For instance, those 8 bits might be mapped or otherwise associated with a word document, spreadsheet, and so on.

Indexing

With the ability to pack, populate, or encode data into unused channels, there is also a desire to organize the data and to have the ability intelligently decode the data. As such, the embodiments are able to generate an index that tracks and monitors which pixels, and in particular which channels for each pixel, have which data (e.g., image data and/or non-image data).

That is, an index is generated that can be used to help encode and decode the data stored in the various channels of the image. When data is encoded into a particular channel, the index is updated to reflect that storing process. When the data is eventually extracted or decoded from the channel, the index is referenced in order to understand how that data correlates to the other data that has already been extracted and/or that is still encoded in the image awaiting extraction (e.g., ordering characteristics as to how bits are ordered relative to one another, as will be described later).

For example, it may be the case that a piece of data is 64 bits in length (or more or less or even multiple segments of 64 bits). It might also be the case that each channel is assigned only 8 bits. In such a scenario, the 64 bits can be divided into 8 bit segments and dispersed among 8 different channels. In order to properly reconstruct the 64 bits of data, the ordering of the data stored among the 8 different channels is relied on (from the index) in order to determine how to reconstruct the data. Further details on these aspects will be provided later.

Figure 4:
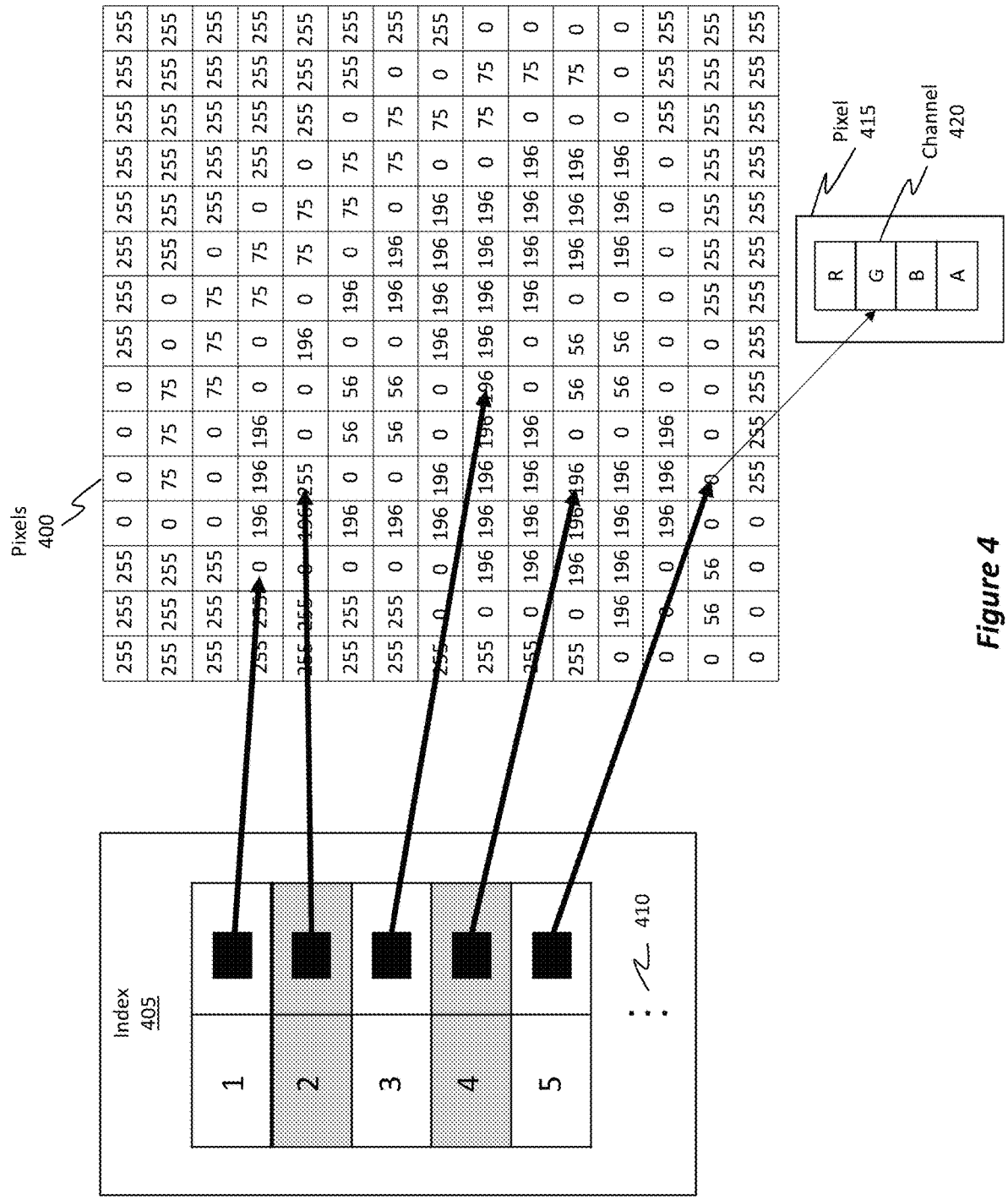
FIG. 4 illustrates the use of an index to map out where different data is stored in the different color channels.

With that understanding, attention will now be directed to FIG. 4, which illustrates a set of pixels 400 representative of the pixels mentioned thus far. FIG. 4 also shows an index 405, which is used to track, monitor, or map what data is stored where and how that data is organized. The index 405 can also be used for ordering purposes in order to reconstruct data based on a defined bit length and sequence (e.g., bit sequence "A" is before bit sequence "B" and so on).

For example, line item "1" of the index 405 shows how data (e.g., non-image data or perhaps even image data) is currently being stored in one of the pixels 400 (e.g., the pixel having the color value of "0"). Line item "2" shows how data is currently being stored in another pixel (e.g., the pixel having the color value of "255"). Line item "3" shows how data is currently being stored in another pixel (e.g., the pixel having the color value "196"). Line item "4" shows how data is currently being stored in another pixel (e.g., the pixel having the color value "196"). Finally, line item "5" shows how data is currently being stored in another pixel (e.g., the pixel having the color value "0"). The ellipsis 410 shows how there may be any number of index items or line items in the index 405.

In some cases, storing the non-image data occurs in a consecutive manner. For instance, data might first be stored in the top leftmost pixel (and a specific channel), and then to the pixel immediately to the right, and then to the pixel immediately to that pixel's right, and so on. In some cases, storing the non-image data occurs in a non-consecutive manner, where data can be placed in any order throughout the image.

For example data might first be stored in the bottom rightmost pixel, and then in the third line farthest from the right pixel, and so on, without a specific ordering. Different selection techniques may be employed with regard to selecting specific channels to store the non-image data as well. The index 405 is able to track or maintain the storing order used to store the non-image data. In some cases, it is beneficial to randomly select pixels and channels to store non-image data and then use the index 405 to track the storing technique. The index 405 can then be encrypted and protected. Because the data was stored in a random manner, if the image were to be intercepted, the data encoded therein would be near impossible to decipher without the use of the index 405. In this regard, protection techniques can be used to safeguard the information. Further details on encryption will be provided later.

The description above was a simplified description of the index 405 in that the description said the line items were pointing to specific pixels. While that is the case, the content of the index 405 can be more detailed. For instance, instead of simply pointing to a pixel, the index 405 can actually point to specific channels of a pixel. To illustrate, line item "5" is pointing to pixel 415 and is further pointing to channel 420 of pixel 415. Therefore, the index 405 operates as a detailed log or map indicating where data is stored not only across pixels but also across the different channels of a pixel. Accordingly, the index 405 can be used during the deconstruction process in which the non-image data is broken down or divided into units of data that are small enough to be stored in the bits assigned to a channel and then encoded into the various channels and pixels of an image. The index 405 can also be used to reconstruct or decode the non-image data at a later time.

Bit Concatenation

Although 1 bit, 2 bits, 4 bits, 8 bits, 16 bits, 32 bits, and so on might be sufficient to define the color characteristics or display parameters for a pixel, that number of bits might not be sufficient to fully define some non-image data. The embodiments are configured to be highly dynamic and flexible in order to store different amounts of data, or rather, data having different bit sizes or lengths. FIGS. 5, 6, 7, and 8 are illustrative.

Figure 5:
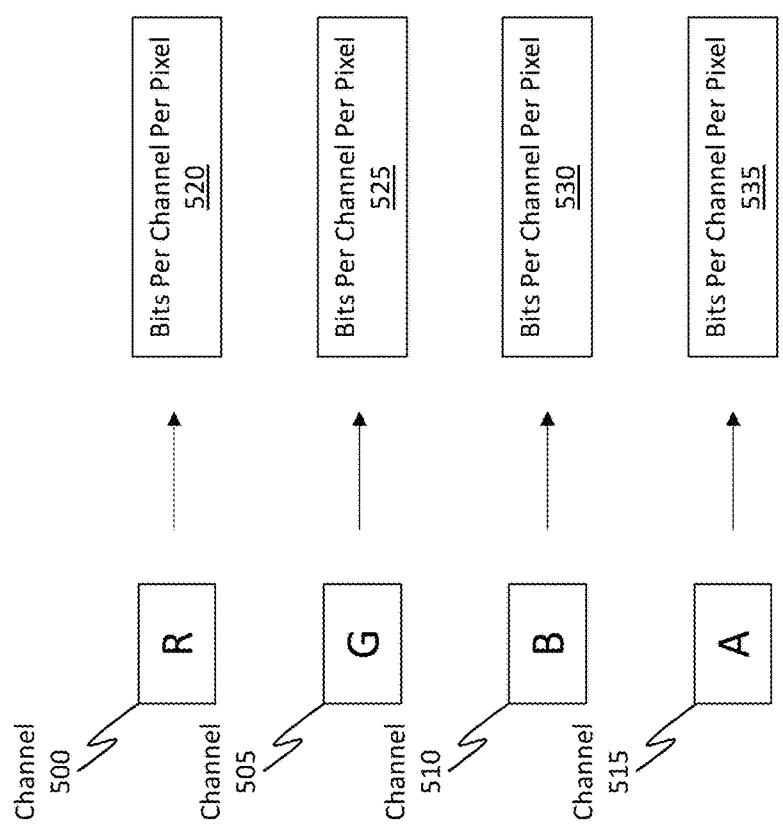
FIG. 5 illustrates how the color channels can be assigned a certain number of bits to store data.

As mentioned earlier, each channel has a certain number of bits assigned to it. FIG. 5 illustrates this scenario.

FIG. 5 shows four channels, namely, channel 500, channel 505, channel 510, and channel 515. Each channel is assigned a specific number of bits in order to store information. To illustrate, channel 500 has a number of bits per channel per pixel 520; channel 505 has a number of bits per channel per pixel 525; channel 510 has a number of bits per channel per pixel 530; and channel 515 has a number of bits per channel per pixel 535. The number of bits per channel can range anywhere from 1 bit to more than 512 bits per channel, as described earlier.

Figure 6:
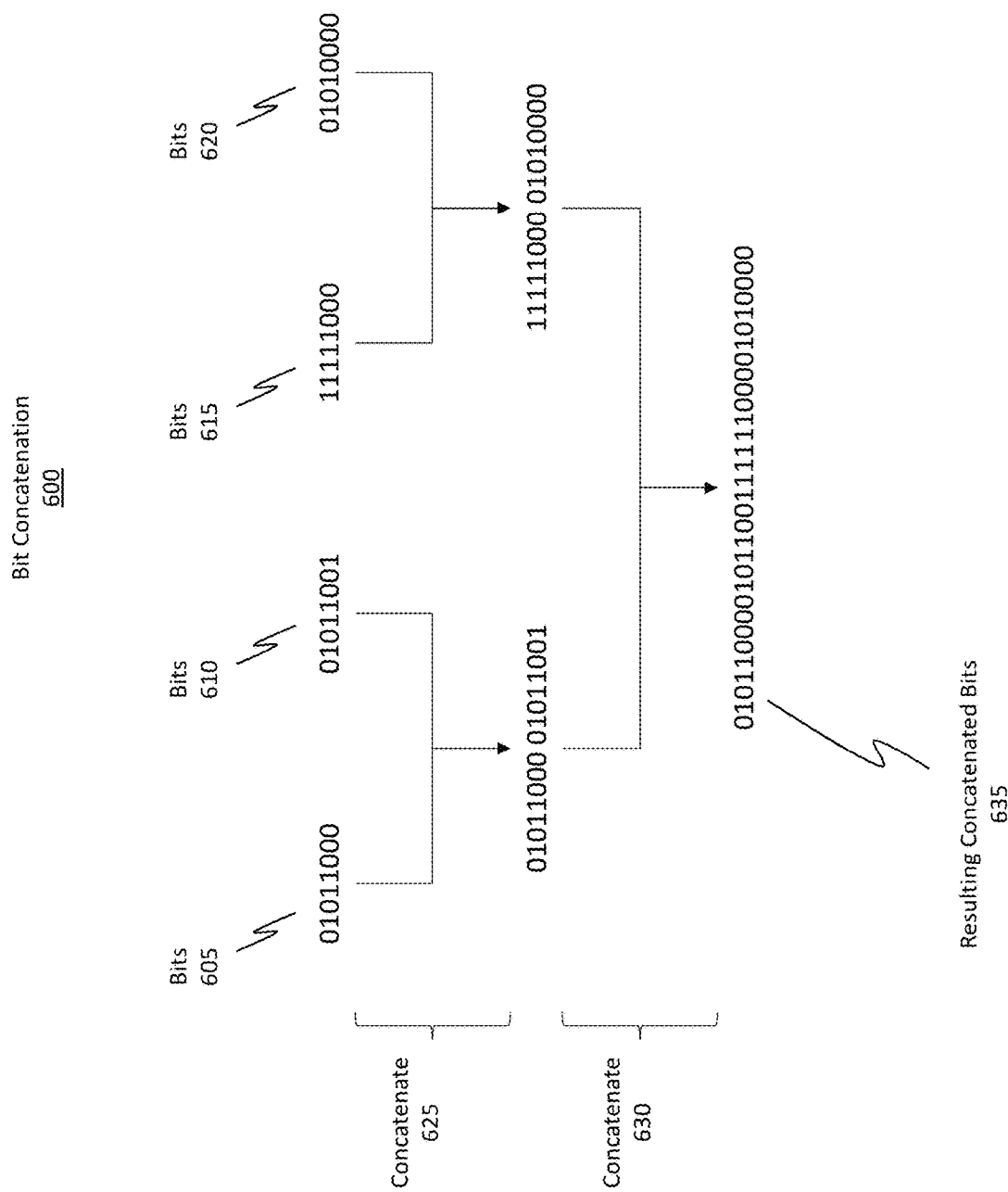
FIG. 6 illustrates a bit concatenation process, which is used to increase the number of bits to store data.

In order to represent more complex or detailed data, the embodiments are able to concatenate the bits from different channels and even from different pixels in order to increase the bit length used to describe data. FIG. 6 shows one example of a bit concatenation 600 process.

Specifically, FIG. 6 shows a first set of bits 605, a second set of bits 610, a third set of bits 615, and a fourth set of bits 620. These bits can all be associated with the same pixel or, alternatively, some of the sets can be associated with different pixels. For instance, perhaps a pixel has four channels (or more than four channels). These four channels can be used to store data (e.g., non-image data or image data). In this sense, the bits 605, 610, 615, and 620 can all be from channels of the same pixel.

Alternatively, one or more of the bits 605, 610, 615, and 620 can be from different pixels. As an example, bits 605 can originate from the green channel (or some other channel) of a first pixel, bits 610 can originate from the green channel (or some other channel) of a second pixel, bits 615 can originate from the green channel (or some other channel) of a third pixel, and bits 620 can originate from the green channel (or some other channel) of a fourth pixel. The bits might even originate from combinations of different channels. For instance, bits 605 might originate from the red channel of a first pixel, bits 610 might originate from the green channel of a second pixel, bits 615 might originate from the blue channel of a third pixel, and bits 620 might originate from the alpha channel of a fourth pixel. In any event, the index mentioned earlier is able to track, monitor, or maintain a mapping as to which channels and which pixels include which data, as well as the proper sequencing or ordering of bits.

Notice, the number of bits in bits 605 is eight. One will appreciate how these disclosed concatenation process can be performed on bit sizes of any length (1 bit, 2 bits, 3 bits, and so on, without limit) to form bit sequences of any length.

The bits 605, 610, 615, and 620 are subjected to a concatenate 625 process. For instance, bits 605 and 610 are concatenated together and bits 615 and 620 are concatenated together. Those two 16-bit pieces of data are then subjected to another concatenate 630 process to form the resulting concatenated bits 635, which is 32 bits in length. Although the above scenario described a two-part concatenation process, one will appreciate how any number of steps (e.g., 1 or more than 1 steps) can be performed.

The index that was mentioned earlier can be relied on to determine the ordering of the concatenation. For instance, the index can instruct the concatenation process to ensure that the bits 605 remain at the front end of the bit segment. Likewise, the index can be used to ensure that the bits 610 are subsequent to the bits 605 and prior to the bits 615 in the resulting sequence, and so on. In this sense, the index can be used to instruct the ordering of the concatenation process.

As a result of concatenating bits, larger amounts and more complex data structures can be stored and disseminated into the image. Images that have relatively larger resolutions have relatively more pixels and channels. If each pixel were to include three unused channels, then the number of bits that is available to store data can be quite high, especially when the option is available to concatenate bits.

Figure 7:
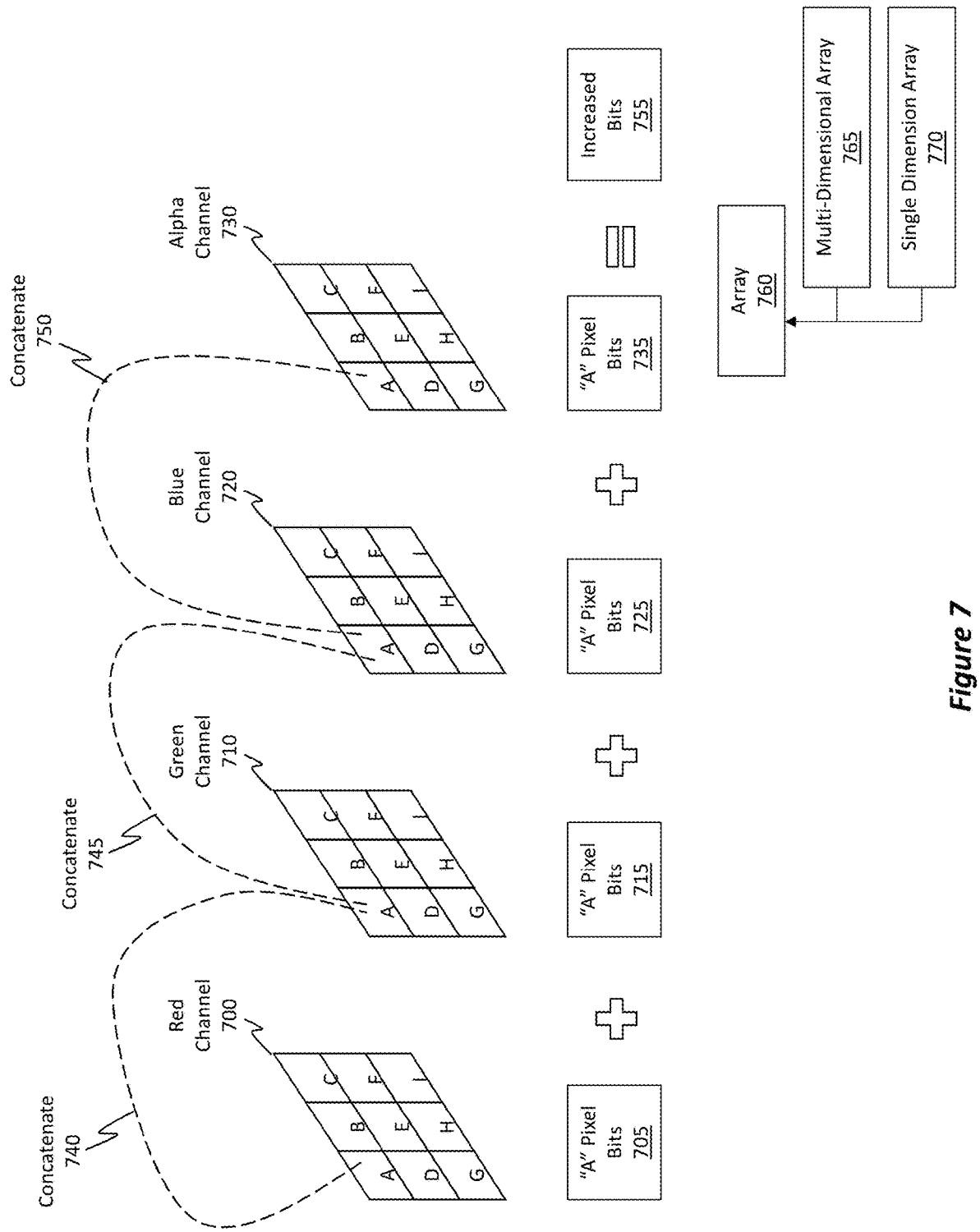
FIG. 7 illustrates another example of a bit concatenation process.

Different techniques can be used to concatenate bits, as shown in FIG. 7. FIG. 7 shows a red channel 700 for pixels "A" through "I," including "A" pixel bits 705; a green channel 710 for pixels "A" through "I," including "A" pixel bits 715; a blue channel 720 for pixels "A" through "I," including "A" pixel bits 725; and an alpha channel 730 for pixels "A" through "I," including "A" pixel bits 735. In this example case, the "A" pixel bits from each of the four different channels are being concatenated together, as shown by concatenate 740, 745, and 750 to generate increased bits 755. The instructions or techniques for concatenating bits can be included in the index.

In this sense, the bits in the various channels can be thought of as an array 760 of bits that are available to store data. The array 760 can be a multi-dimensional array 765 or a single dimension array 770. Accordingly, FIG. 7 shows an example concatenation technique in which the bits for different channels (e.g., red, green, blue, and alpha channels) of the same pixel (e.g., pixel "A") are concatenated together.

Figure 8:
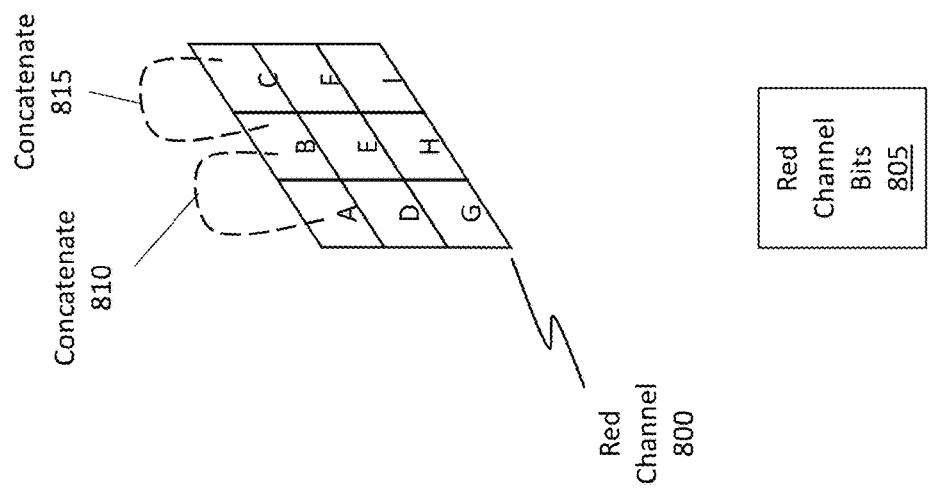
FIG. 8 illustrates another bit concatenation process.

FIG. 8, on the other hand, shows a scenario where bits stored in a specific channel (e.g., the "red" channel) of different pixels (e.g., pixels "A" through "C") are concatenated together. Specifically, FIG. 8 shows a red channel 800 for pixels "A" through "I." FIG. 8 also shows the bits for those red channels, as indicated by red channel bits 805. The red channel bits for pixel "A" are concatenated with the red channel bits for pixel "B," as shown by concatenate 810. Similarly, those bits are being concatenated with the red channel bits for pixel "C," as shown by concatenate 815.

Accordingly, bits from the same pixel or bits from different pixels can be concatenated. Bits from the same type of channel (e.g., red channel) can be concatenated with bits from the same channel type but from a different pixel. Additionally, or alternatively, bits from one channel type (e.g., a red channel) can be concatenated with bits from a different channel type (e.g., a green channel) from a different pixel. Indeed, any type of concatenation can occur, where the methodology is defined by the index.

Encoding Architecture

Figure 9:
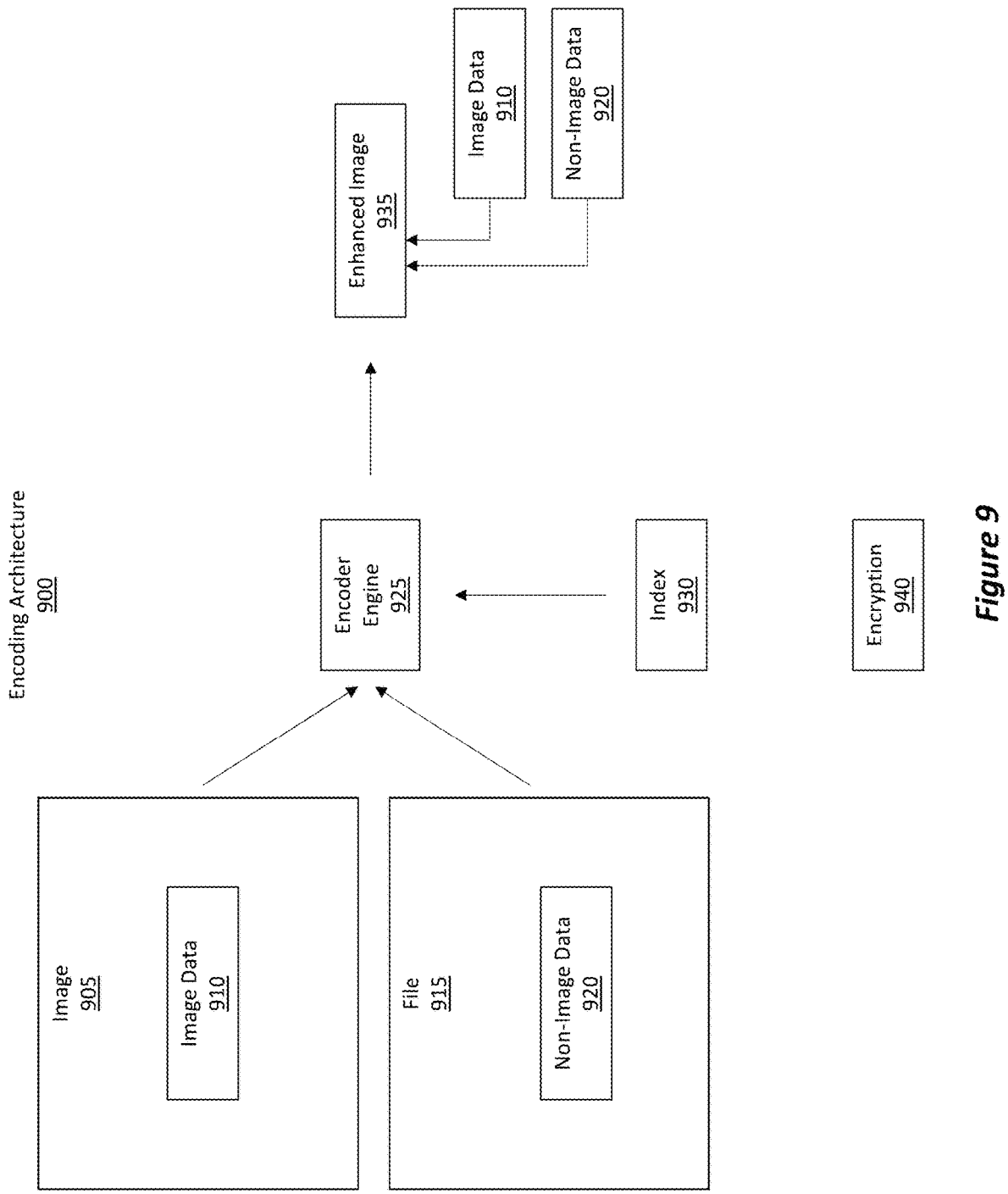
FIG. 9 illustrates an example of an encoding architecture used to encode non-image data into color channels of an image's pixels.

FIG. 9 shows an example encoding architecture 900 that may be used to encode or populate image data and non-image data into the various channels of an image's pixels. The encoding architecture 900 shows an image 905 that includes image data 910. The image data 910 includes data defining the color or display parameters, attributes, or characteristics for pixels of the image 905. For instance, the color or display characteristics can be black and white, RGB, or any other color type.

The encoding architecture 900 also shows a file 915 having non-image data 920. The file 915 can be any type of file, without limit. For instance, the file 915 can be a word document, a spreadsheet, a slide deck, a notepad file, and so on. The non-image data 920 can be any type of data without limit. That is, while the image data 910 is limited to defining display characteristics for image pixels, the non-image data 920 is unlimited and can represent any type of data. As an example, the non-image data 920 can be metadata describing other data, including perhaps even the image data 910. The non-image data 920 can relate to any technical field, including any engineering field, medical field, art field, and so on.

The image 905 and the file 915, or at least the image data 910 and the non-image data 920, are fed as input into the encoder engine 925, which generates a so-called enhanced image 935. The enhanced image 935 is packed or encoded with both the image data 910 and the non-image data 920.

For example, one or more color channels for one or more pixels of the enhanced image 935 can be encoded to include the image data 910. Similarly, one or more color channels for one or more pixels of the enhanced image 935 can be encoded to include the non-image data 920. In this sense, the enhanced image 935 is a carrier or transporter for different data structures or rather different data types (e.g., image data as one data structure/type and non-image data as a different data structure/type).

During the encoding process in which data is loaded or encoded into the various different channels, the encoder engine 925 generates, modifies, or at least refers to an index 930. The index 930 details how at least the non-image data is deconstructed into storable units of data (e.g., corresponding to the bit size of the channels) and dispersed or encoded into the different channels. The index 930 will also subsequently be used in order to reconstruct the non-image data.

In some optional cases (as will be discussed in more detail later), the index 930 can also be encoded into the enhanced image 935. For instance, a selected number of bits (e.g., from certain selected channels and pixels) can be reserved or prioritized in the enhanced image 935 to carry the index 930. As an example, perhaps the first "x" number of pixels and channels in the image (e.g., perhaps pixels starting from the top left of the image and progressing in a consecutive manner) are reserved to store the index 930. When the enhanced image 935 is transmitted or stored, the index 930 is transmitted or stored as well. Alternatively, the index 930 can be stored in an external file and transmitted or stored separately. Further details on this aspect will be provided later.

In some implementations, the data encoded in the various channels can be encrypted, as shown by encryption 940. That is, if the enhanced image 935 includes sensitive data, then that sensitive data can be protected via the encryption 940. As an example, suppose the image 905 is a medical image of a person's body. The non-image data 920 might be the personal details and health history of the person. The embodiments are able to encode the non-image data 920 with the image data 910 into the enhanced image 935. In order to safeguard against malicious interception, the embodiments can encrypt the image data 910 and/or the non-image data 920. By encrypting at least the non-image data 920 (e.g., the person's personal details and health history), then the anonymity of the person can be preserved.

Accordingly, the encoder engine 925 is able to encode different data structures or different types of data into a single image to generate the enhanced image 935. As a result of encoding different data types (e.g., image data and non-image data) into the enhanced image 935, the enhanced image 935 will be a single image having data of differing types that will be interpreted in different manners.

Figure 10:
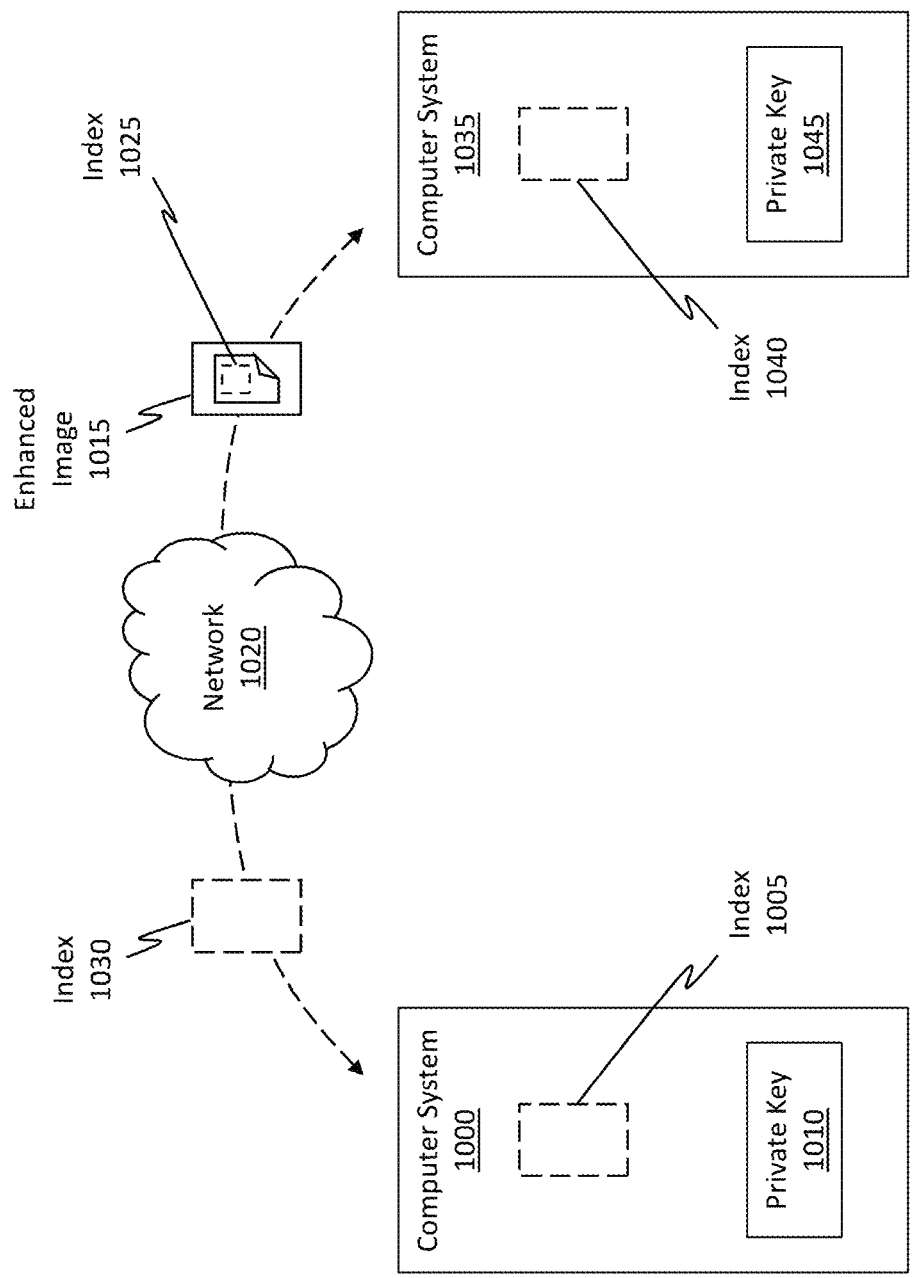
FIG. 10 illustrates an example process of transmitting an enhanced image from one computer system to another computer system.

FIG. 10 shows a scenario where the enhanced image 935 of FIG. 9 is transmitted from one computer system to a different computer system. In particular, the computer system 1000 is the computer system that generates the enhanced image. Optionally, the computer system 1000 can retain a copy of the index 1005 associated with the enhanced image. In some cases, the computer system 1000 also uses a private key 1010 and/or a public key to encrypt the enhanced image and to address it to the computer system 1035.

The computer system 1000 then transmits the enhanced image 1015 over a network 1020. In some cases the enhanced image 1015 includes the index 1025 (as discussed earlier) while in other cases the index is transmitted separately in its own set of data packets, as shown by index 1030.

The computer system 1035 receives the enhanced image 1015. In the scenario where the index 1030 is transmitted separately from the enhanced image 1015, then the computer system 1035 also receives a copy of the index, as shown by index 1040. In some cases, the computer system 1035 might have its own copy of the index without having to receive it from the computer system 1000. Optionally, the computer system 1035 can use a private key 1045 or public key to decrypt the enhanced image 1015. As will be discussed shortly, the computer system 1035 can then use the index to decode the enhanced image 1015. In some cases, the computer system 1035 is a server or computer operating in a cloud environment.

Figure 11:
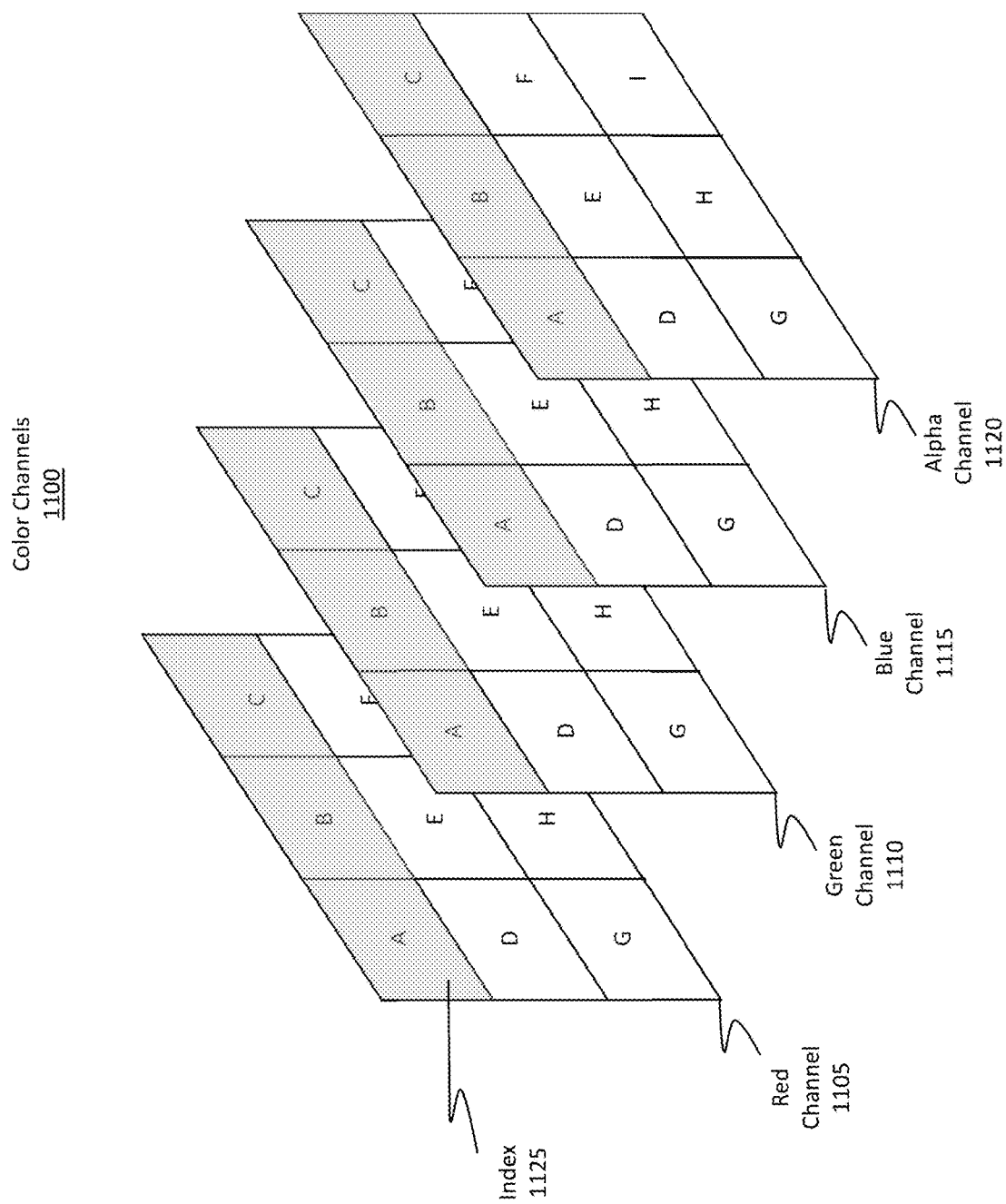
FIG. 11 illustrates how an index can also be stored in the color channels of an image.

FIG. 11 shows a scenario where certain bits of an enhanced image are reserved to store the index, as was introduced earlier. In particular, FIG. 11 shows various color channels 1100, such as the red channel 1105, the green channel 1110, the blue channel 1115, and the alpha channel 1120, for various pixels (e.g., pixels "A" through "I"). In this example scenario, the red, green, blue, and alpha channels for pixels "A" through "C" have been reserved (as shown by the gray coloring) to store the index 1125 that is used to map out which bits store which data. Accordingly, in some embodiments, the index itself can also be stored in the enhanced image, and the index is also considered to be non-image data. One will appreciate how the index can be stored throughout any part of the pixels and channels, and the illustration shown in FIG. 11 is simply one example implementation.

Decoding Architecture

Figure 12:
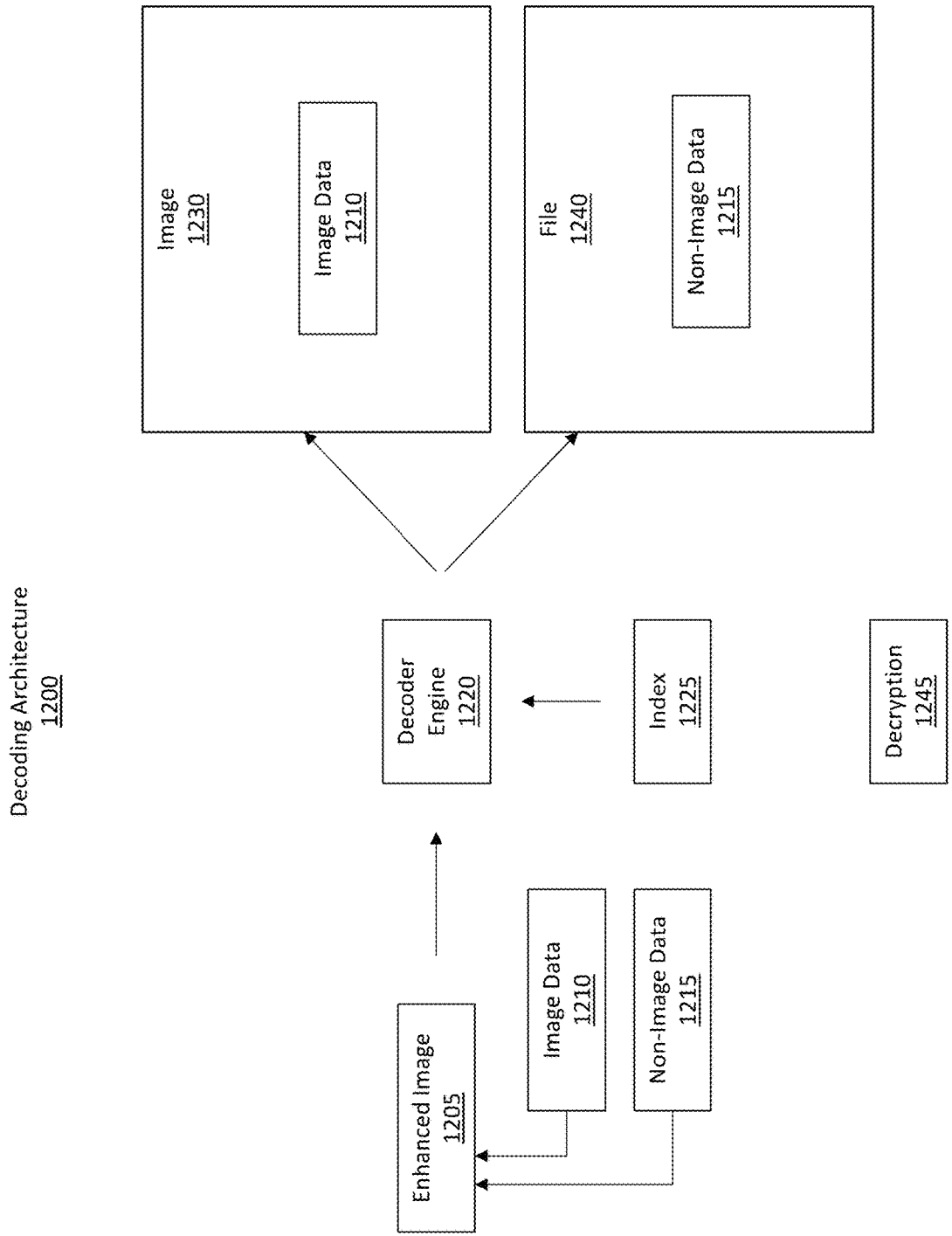
FIG. 12 illustrates an example of a decoding architecture that may be used to decode an image to extract image data and non-image data.

FIG. 12 shows a decoding architecture 1200 that is used to decode, extract, or unpack the information that is included in an enhanced image 1205, which stores data having different data types, such as image data 1210 and non-image data 1215. The enhanced image 1205 is fed as input into a decoder engine 1220. The decoder engine 1220 also accesses the index 1225.

In scenarios where the index 1225 is stored in the enhanced image 1205, then the decoder engine 1220 is preconfigured or optionally instructed via some mechanism (e.g., an instruction packet or flag) to identify where the index 1225 is located in the enhanced image 1205. Alternatively, in scenarios where the index 1225 is not stored in the enhanced image 1205, then the decoder engine 1220 obtains access to the index 1225, such as by accessing storage of the computer system that is storing the index 1225, as described earlier in FIG. 10.

The decoder engine 1220 uses the index 1225 to decode the enhanced image 1205. That is, the decoder engine 1220 identifies which bits in the enhanced image 1205 are used to store image data and which bits in the enhanced image 1205 are used to store non-image data. The decoder engine 1220, if instructed via the index 1225, concatenates bits that store non-image data and eventually reconstructs the various data structures. For instance, FIG. 12 shows how the decoder engine 1220 is able to decode the enhanced image 1205 to generate an image 1230, which now includes the image data 1210, and a file 1240, which now includes the non-image data 1215. One will appreciate how the image 1230 and the file 1240 are representative of the image 905 and the file 915, respectively, from FIG. 9. Optionally, the decoder engine 1220 can also decrypt the contents of the enhanced image 1205, as shown by decryption 1245, if those contents were originally encrypted.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 13:
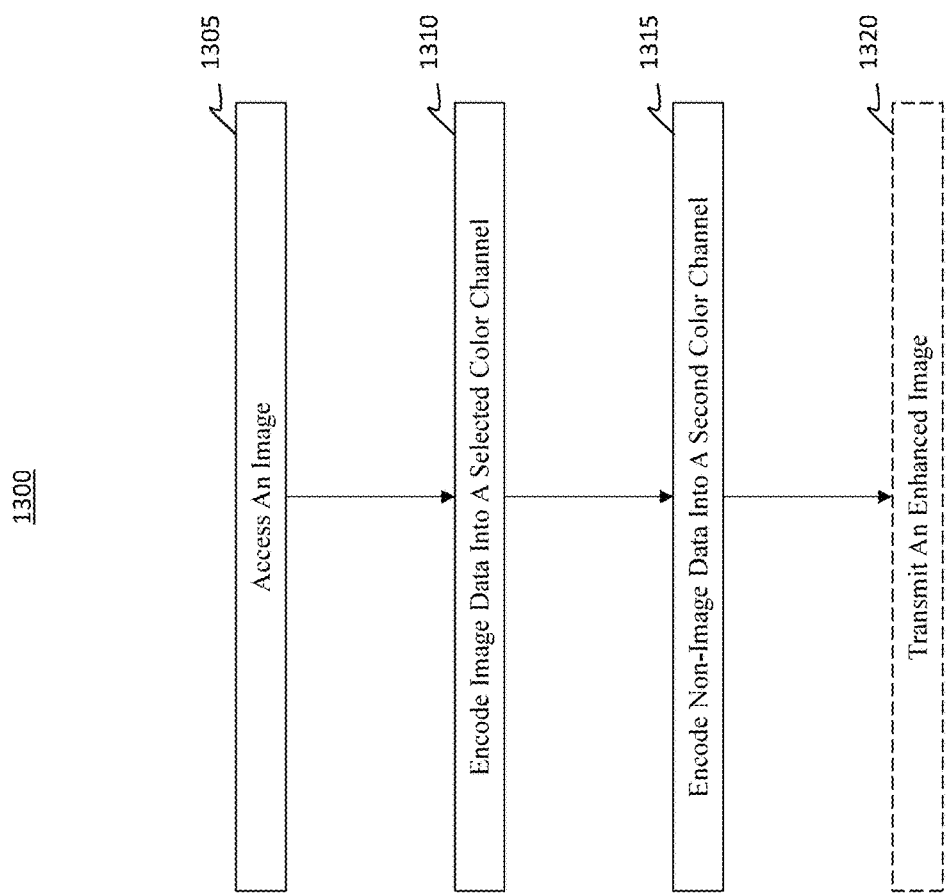
FIG. 13 illustrates a flowchart of an example method for encoding an enhanced image with non-image data and with image data, where the non-image data is distinct from the image data in that the image data is limited to defining display attributes associated with an image (e.g., color or pixel characteristics) while the non-image data is unlimited and can describe data other than image or display attributes.

Attention will now be directed to FIG. 13, which illustrates a flowchart of an example method 1300 for encoding an enhanced image with non-image data and with image data. As discussed previously, the non-image data is distinct from the image data in that the image data is limited to defining attributes, parameters, or characteristics associated with an image (e.g., display parameters for pixels) while the non-image data is unlimited and can describe data other than image/display attributes. The method 1300 can be performed within the encoding architecture 900 of FIG. 9 and by the computer system 1000 of FIG. 10.

Initially, method 1300 includes an act (act 1305) of accessing an image. Notably, the image comprises one or more pixels, and each one of those pixels is associated with a corresponding one or more color channels (e.g., perhaps a red, green, blue, and/or alpha channel). For instance, each pixel can be associated with 1 channel, at least 2 channels, at least 3 channels, or perhaps at least 4 channels. In some cases, the number of channels is more than 4 channels (e.g., 5, 6, 7, 8, 9, 10, or perhaps even more than 10).

The image is configured to have a particular image resolution or a defined image resolution. One will appreciate, however, how any resolution can be used. For instance, the image can be a medical image and can have an image resolution of 512 pixels by 512 pixels (512×512). Higher or smaller image resolutions can also be used (e.g., 256×256, or any other resolution). Resolutions even as small as at least 1 pixel by 1 pixel can be used.

In some instances, the image data includes grayscale image data and only a single channel is used for the image data (e.g., perhaps a channel has 8 bits, and the values 0 to 255 are used to define the grayscale image data or grayscale pixel color value for that channel). In some cases, the image data includes RGB color data and multiple color channels are used for the image data. Regardless of what type of data the image data has (e.g., RGB, BW, etc.), the image also includes one or more unused color channels. The embodiments are configured to intelligently use any unused color channels in order to store supplemental or auxiliary data (i.e. the non-image data). In this manner, the image can be used as a transportation mechanism for transmitting or transporting both image data and non-image data using fewer network resources as a result of transmitting fewer packets over the network (i.e. the non-image data is packed into the image instead of being transmitted separately).

In some cases, the channels used to store the image data are at least 8 bits in length, though more or less bits can be used. In some cases, the number of bits can be as few as 1 while in other cases the number can exceed 8 (e.g., 16, 24, 32, 64, 128, 256, 512, more than 512). Similarly, the number of bits for the channels used to store the non-image data can be as few as 1 or more than 8 (e.g., 16, 24, 32, 64, 128, 256, 512, more than 512).

For a selected pixel that is selected from among the one or more pixels in the image, act 1310 involves encoding image data into a selected color channel that is selected from among the selected pixel's corresponding one or more color channels.

For that same selected pixel, act 1315 involves encoding non-image data into a second color channel of the selected pixel. Notably, an index provides a mapping as to where the non-image data has been encoded in the image. Furthermore, as a result of (i) encoding the image data into the selected color channel and (ii) encoding the non-image data into the second color channel, an enhanced image is generated.

As discussed throughout, any type of data can be used as "non-image data." For instance, the non-image data can include data corresponding to a Hounsfield value associated with a medical image. The non-image data can include data corresponding to any type of document, spreadsheet, slide deck, and so on, without limit. The non-image data can include data corresponding to virtual reality image file or augmented reality file. Indeed, any type of data that describes content beyond just color or display characteristics can be used.

In some cases, the bit size of the non-image data is different than the bit size of the image data. For instance, 8 bits might be sufficient to store the image data while 8 bits might not be sufficient to store the non-image data. To accommodate the different needs, the embodiments can concatenate bits to produce larger bit lengths for the non-image data. The encoding process can include breaking or dividing the non-image data into smaller bit segments, where the size of the bit segments is dependent on the bit size of the channels.

The encoding process can occur for any number of channels and for any number of pixels in the image. By way of example, for that selected pixel (or for any other pixel), the embodiments can encode second non-image data into a third channel of the selected pixel and optionally even encode third non-image data into a fourth channel of the selected pixel.

Additionally, for a second (or any number) pixel, the embodiments can encode additional image data into one color channel of the second pixel and encode additional non-image data into one or more of (i) a second color channel of that second pixel, (ii) a third channel of that second pixel, and (iii) a fourth channel of that second pixel. The non-image data can be dispersed or encoded across any number of channels of any number of pixels.

As an optional act (as shown by the dashed border in FIG. 13), act 1320 involves transmitting the enhanced image to an external computer system. The external computer system can receive the enhanced image and then decode it in the manner described earlier. Such a decoding process is also reflected in the flowchart of FIG. 14.

Figure 14:
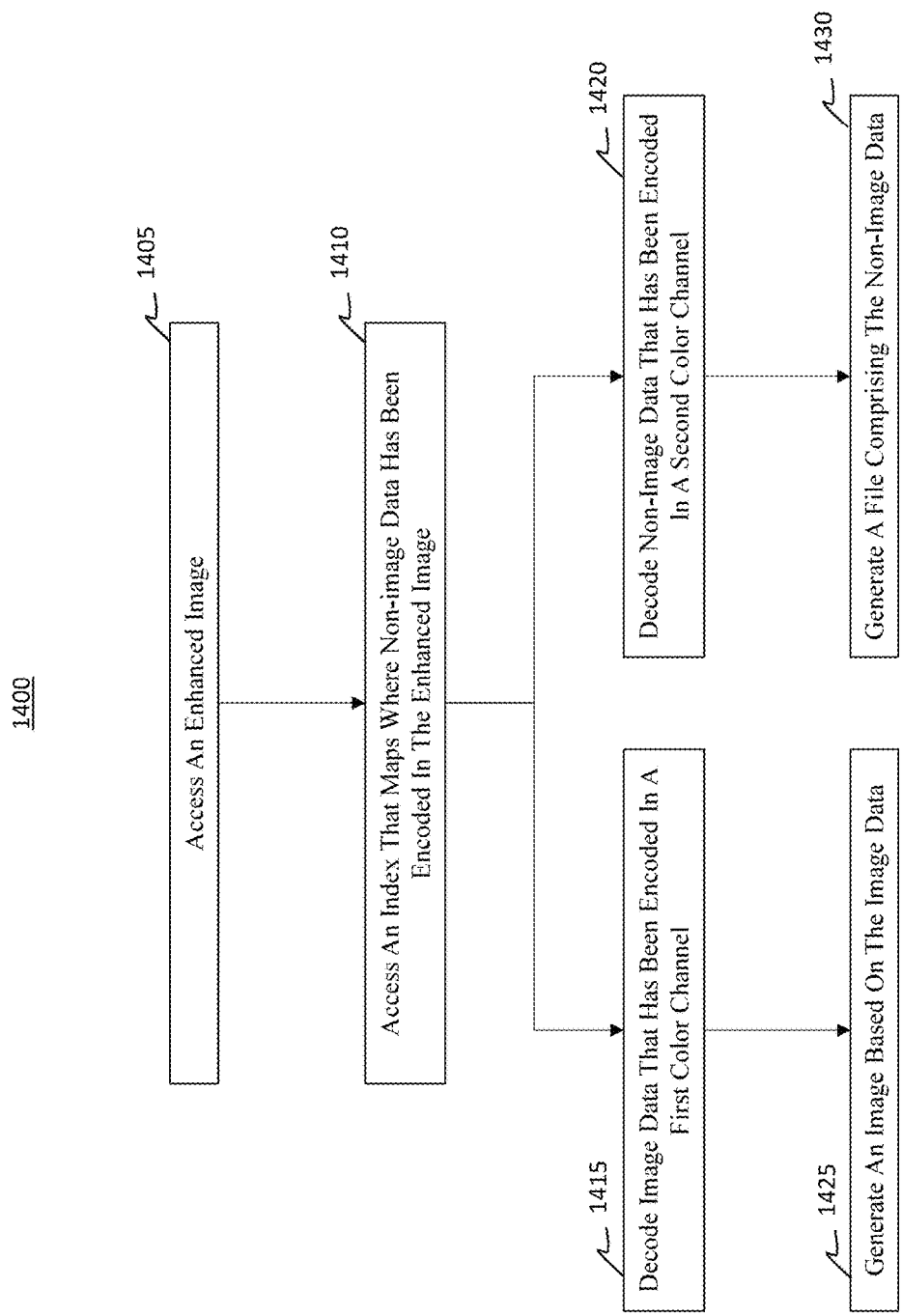
FIG. 14 illustrates a flowchart of an example method for decoding an enhanced image.

Specifically, FIG. 14 shows a flowchart of an example method 1400 for decoding an enhanced image that has been encoded to include data having non-image data and image data. Method 1400 can be performed using the decoding architecture 1200 of FIG. 12 and by the computer system 1035 of FIG. 10.

Initially, method 1400 includes an act (act 1405) of accessing (e.g., perhaps receiving from an external computer system) an enhanced image. The enhanced image comprises one or more pixels, and each one of the pixels is associated with a corresponding one or more color channels.

Act 1410 includes accessing an index that maps where non-image data has been encoded in the enhanced image (e.g., in the channels and pixels). The index can be received or accessed separately from the enhanced image and can also be stored locally and separately on the computer system. Alternatively, the index can at least partially be encoded in the enhanced image. As such, the process of accessing the index can include decoding the enhanced image to extract the index.

For a selected pixel that is selected from among the one or more pixels of the enhanced image, there is an act (act 1415) of decoding image data that has been encoded in a first color channel of the selected pixel.

In parallel or in series with act 1415, there is an act (act 1420) of decoding (for that same selected pixel) non-image data that has been encoded in a second color channel of the selected pixel. Notably, the index is used to identify that the second color channel is storing the non-image data. The decoding process can include concatenating bits from different channels and pixels in order to reconstruct or decode the non-image data. For instance, it might have been the case that the non-image data was divided into multiple bit segments in order to be stored in the various channels. The decoding process can combine or reconstruct the various segmented bit lengths into their original form.

Act 1425 involves generating an image based on the image data. In parallel or in series with act 1425, act 1430 involves generating a file comprising the non-image data.

Figure 15:
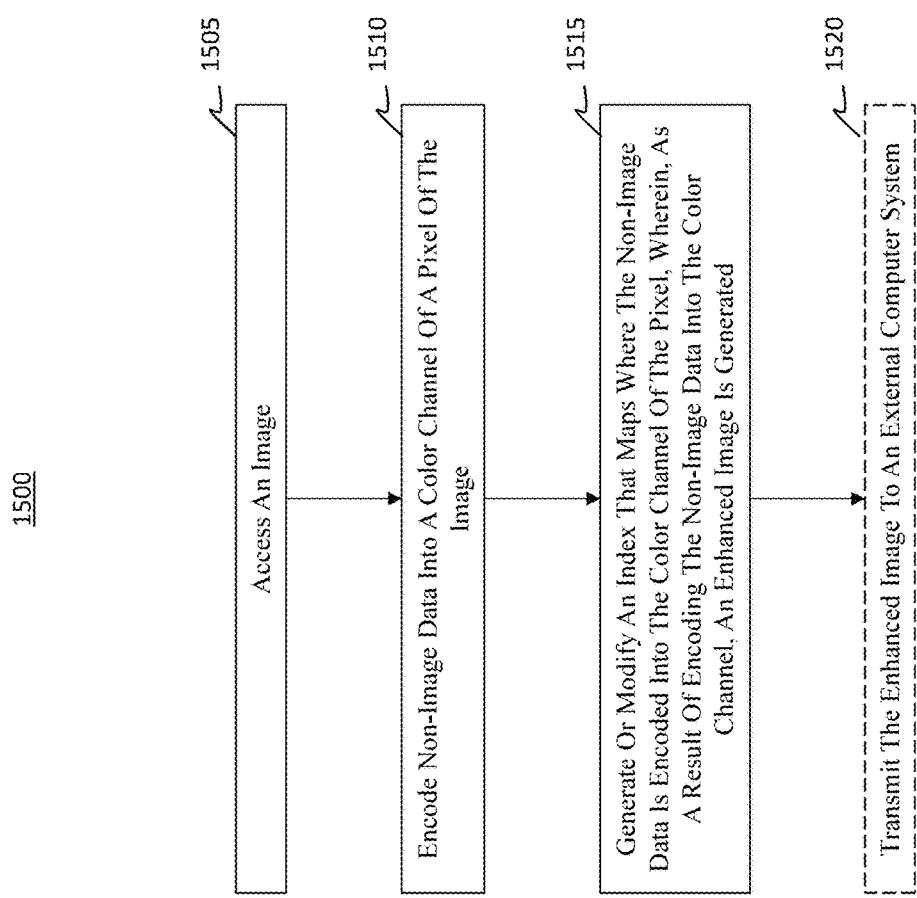
FIG. 15 illustrates a flowchart of an example method for encoding an enhanced image with non-image data.

FIG. 15 illustrates another example method 1500 for encoding an enhanced image with non-image data. Notably, the non-image data is distinct from image data in that the image data defines display characteristics of an image while the non-image data describes data other than display characteristics. For instance, the image data can include grayscale color data or RGB color data or any other type of color data or display data (e.g., hue, saturation, tint, transparency, etc.).

Initially, there is an act (act 1505) of accessing an image. The image comprises at least one pixel that is associated with at least one color channel. The color channel can be one of a red color channel, a green color channel, a blue color channel, or an alpha channel. In some cases, the at least one color channel is included among multiple color channels, such as perhaps at least three different color channels or perhaps at least four different color channels. A number of bits are assigned to the color channel. That number can be 1 bit, 2 bits, 4 bits, 8 bits, 16 bits, 24 bits, 32 bits, 64 bits, or more than 64 bits.

In some cases, the image is a standalone image. In other cases, the image is included as a part of a video. Multiple images can form the video, and those images can include different types of data (e.g., both "image data" and "non-image data").

There is also an act (act 1510) of encoding non-image data into the color channel of the pixel. Act 1515 involves generating a new index or perhaps modifying an existing index. This index maps where the non-image data has been encoded in the color channel of the pixel. As a result of encoding the non-image data into the color channel, an enhanced image is generated.

One will appreciate how any other pixels and channels in the image can also be encoded with non-image data. For instance, the pixel mentioned above can be associated with a second color channel, and the method 1500 can include an act of encoding additional non-image data into that second channel.

Method 1500 includes an optional act 1520, as reflected by the dashed border in FIG. 15. In particular, act 1520 includes transmitting the enhanced image to an external computer system. Optionally, the method 1500 can include an act of decoding the enhanced image, as discussed previously. Accordingly, the disclosed embodiments are able to utilize resources (particularly network resources) more efficiently by packing additional data into a data structure (e.g., an image). That image, which now includes enhanced data and is now an enhanced image, can be transmitted to external systems.

Accordingly, the disclosed embodiments can be leveraged or utilized in numerous different ways. In the context of medical images, such as DICOM images, these images are in black and white. Therefore, the RGB channels will all be equivalent to each other. Since all of these channels are equivalent, a single channel is actually sufficient in order to render the image. The other channels (GB or GBA) can be packed with other pixel data and evaluations. For instance, per pixel Hounsfield values can be packed into the G channel, per pixel SUV values can be packed in the B channel, and segmentation information can be packed into the A channel. In some instances, the channels can also be packed with multiple image-only data. In some cases, the packed data can originate from different images while in other cases the packed data can originate from the same image. To further clarify, instead of packing channels with both image data and non-image data, some embodiments pack the channels with only the image data. In some cases, the image data can originate from multiple different images or, alternatively, from the same image.

Example Computer/Computer Systems

Figure 16:
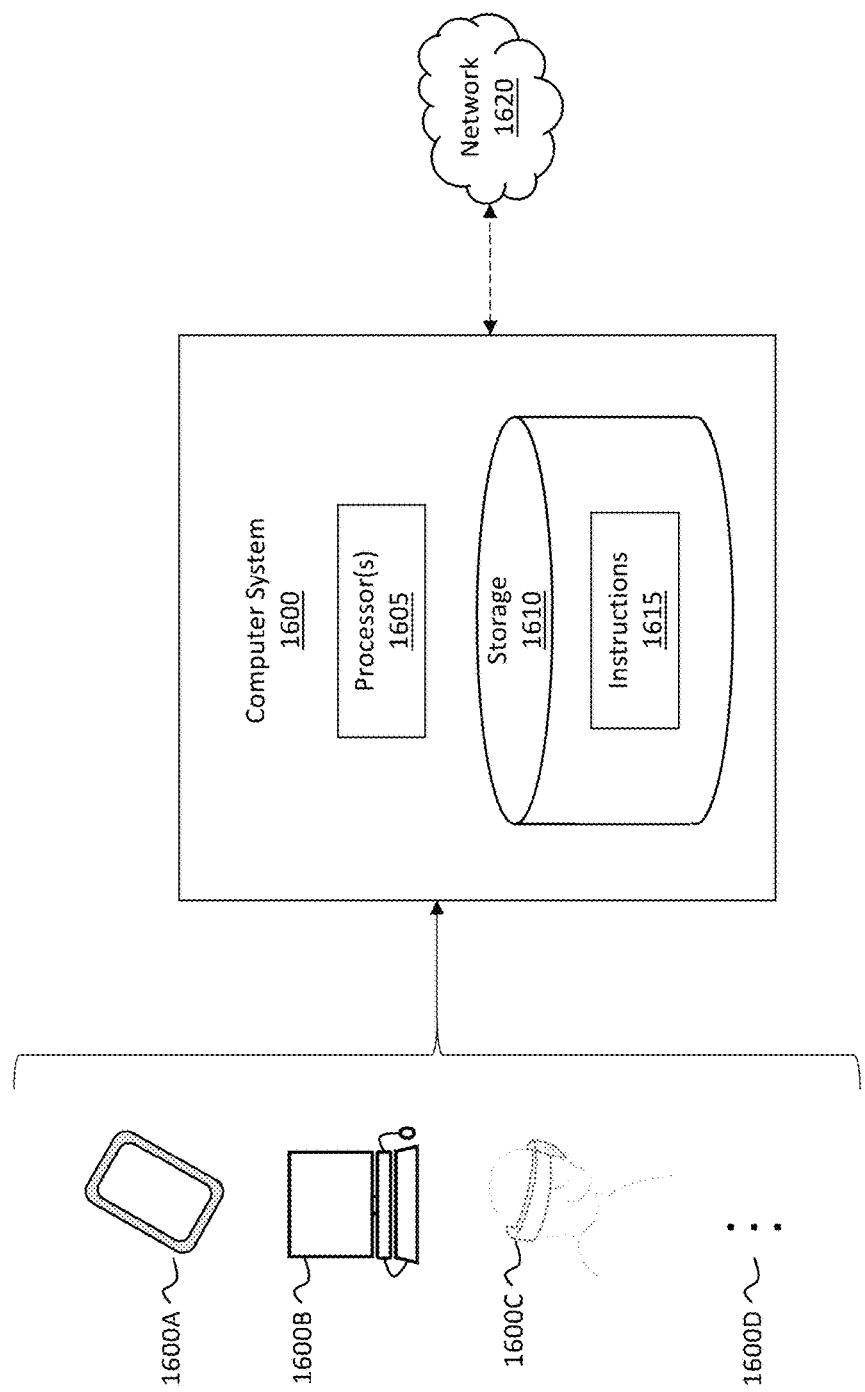
FIG. 16 illustrates an example computer system configured to perform any of the disclosed operations.

Attention will now be directed to FIG. 16 which illustrates an example computer system 1600 that may include and/or be used to perform any of the operations described herein. The computer systems 1000 and 1035 from FIG. 10 are representative of the computer system 1600.

Computer system 1600 may take various different forms. For example, computer system 1600 may be embodied as a tablet 1600A, a desktop or a laptop 1600B, a wearable device 1600C, a mobile device, or a standalone device. The ellipsis 1600D indicates how the computer system 1600 can take on any type of form factor. Computer system 1600 may also be a distributed system that includes one or more connected computing components/devices that are in communication with computer system 1600.

In its most basic configuration, computer system 1600 includes various different components. FIG. 16 shows that computer system 1600 includes one or more processor(s) 1605 (aka a "hardware processing unit") and storage 1610.

Regarding the processor(s) 1605, it will be appreciated that the functionality described herein can be performed, at least in part, by one or more hardware logic components (e.g., the processor(s) 1605). For example, and without limitation, illustrative types of hardware logic components/ processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 1600. The different components, modules, engines, and services described herein may be implemented as objects or processors that execute on computer system 1600 (e.g. as separate threads).

Storage 1610 may be physical system memory, which may be volatile, non-volatile, or some combination of the two. The term "memory" may also be used herein to refer to non-volatile mass storage such as physical storage media. If computer system 1600 is distributed, the processing, memory, and/or storage capability may be distributed as well.

Storage 1610 is shown as including executable instructions 1615. The executable instructions 1615 represent instructions that are executable by the processor(s) 1605 of computer system 1600 to perform the disclosed operations, such as those described in the various methods.

The disclosed embodiments may comprise or utilize a special-purpose or general-purpose computer including computer hardware, such as, for example, one or more processors (such as processor(s) 1605) and system memory (such as storage 1610), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1600 may also be connected (via a wired or wireless connection) to external sensors (e.g., one or more remote cameras) or devices via a network 1620. For example, computer system 1600 can communicate with any number devices or cloud services to obtain or process data. In some cases, network 1620 may itself be a cloud network. Furthermore, computer system 1600 may also be connected through one or more wired or wireless networks 1620 to remote/separate computer systems(s) that are configured to perform any of the processing described with regard to computer system 1600.

A "network," like network 1620, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1600 will include one or more communication channels that are used to communicate with the network 1620. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for encoding an enhanced image with non-image data, where the non-image data is distinct from image data in that the image data defines display characteristics of an image while the non-image data describes data other than display characteristics, said method comprising:
   accessing an image, wherein the image comprises at least one pixel that is associated with at least one color channel, wherein the at least one color channel is assigned a number of bits to store data, and wherein the number of bits is within a range spanning from 1 bit to 512 bits;
   encoding non-image data into said at least one color channel of the at least one pixel; and
   generating or modifying an index that maps where the non-image data has been encoded in said at least one color channel of the at least one pixel, wherein, as a result of encoding the non-image data into the at least one color channel, an enhanced image is generated.

2. The method of claim 1, wherein the at least one color channel is one of a red color channel, a green color channel, a blue color channel, or an alpha channel.

3. The method of claim 1, wherein the at least one color channel is included in a plurality of color channels comprising at least three different color channels.

4. The method of claim 1, wherein the image has an image resolution of at least 512 pixels by 512 pixels.

5. The method of claim 1, wherein the image data includes grayscale color data.

6. The method of claim 1, wherein at least 8 bits are assigned to the at least one color channel.

7. The method of claim 1, wherein the image is a medical image, and wherein the non-image data includes data corresponding to a Hounsfield value associated with the medical image.

8. The method of claim 1, wherein the at least one color channel is assigned a number of bits to store data, and wherein the number of bits is one of: 1 bit, 2 bits, 4 bits, 8 bits, 16 bits, 24 bits, 32 bits, or 64 bits.

9. The method of claim 1, wherein the at least one pixel is associated with a second color channel, and wherein the method further includes encoding additional non-image data into the second color channel of the at least one pixel.

10. The method of claim 9, wherein the method further includes decoding the enhanced image.

11. A computer system configured to encode an enhanced image with non-image data and with image data, where the non-image data is distinct from the image data in that the image data is limited to defining attributes associated with an image while the non-image data is unlimited and can describe data other than image attributes, said computer system comprising:
   one or more processors; and
   one or more computer-readable hardware storage devices that store instructions that are executable by the one or more processors to cause the computer system to at least:
      access an image, wherein the image comprises one or more pixels, and wherein each pixel in the one or more pixels is associated with a corresponding one or more color channels;
      for a selected pixel that is selected from among the one or more pixels, encode image data into a selected color channel that is selected from among the selected pixel's corresponding one or more color channels; and
      for the selected pixel, encode non-image data into a second color channel of the selected pixel, wherein:
         an index provides a mapping as to where the non-image data has been encoded in the image, and
         as a result of (i) encoding the image data into the selected color channel and (ii) encoding the non-image data into the second color channel, an enhanced image is generated.

12. The computer system of claim 11, wherein the selected color channel is associated with at least 8 bits to store the image data.

13. The computer system of claim 11, wherein the second color channel is associated with at least 8 bits to store the non-image data.

14. The computer system of claim 11, wherein an image resolution of the image is at least 256 pixels by 256 pixels.

15. The computer system of claim 11, wherein the image data defines a grayscale pixel color value for the selected pixel.

16. The computer system of claim 11, wherein the instructions are further executable to cause the computer system to at least:
   for the selected pixel, encode second non-image data into a third color channel of the selected pixel; and
   for the selected pixel, encode third non-image data into a fourth color channel of the selected pixel.

17. The computer system of claim 11, wherein the image is a medical image generated using a medical device, and wherein an image resolution of the medical image is at least 512 pixels by 512 pixels.

18. The computer system of claim 11, wherein at least a part of the index is encoded into a plurality of color channels of the enhanced image.

19. A computer system configured to decode an enhanced image comprising non-image data and image data, where the non-image data is distinct from the image data in that the image data is limited to defining attributes associated with an image while the non-image data is unlimited and can describe data other than image attributes, said computer system comprising:
   one or more processors; and
   one or more computer-readable hardware storage devices that store instructions that are executable by the one or more processors to cause the computer system to at least:
      access an enhanced image, wherein the enhanced image comprises one or more pixels, and wherein each pixel in the one or more pixels is associated with a corresponding one or more color channels;
      access an index that maps where non-image data has been encoded in the enhanced image;
      for a selected pixel that is selected from among the one or more pixels, decode image data that has been encoded in a first color channel of the selected pixel;
      for the selected pixel, decode non-image data that has been encoded in a second color channel of the selected pixel, wherein the index is used to identify that the second color channel is storing the non-image data;
      generate an image based on the image data; and
      generate a file comprising the non-image data.

20. The computer system of claim 19, wherein:
   the index is stored separately from the enhanced image or, alternatively, the index was at least partially encoded in a plurality of color channels of the enhanced image, and wherein accessing the index includes decoding the index from the plurality of color channels to extract the index from the enhanced image.

\* \* \* \* \*